United States Patent
Shirato et al.

(10) Patent No.: US 9,399,588 B2
(45) Date of Patent: Jul. 26, 2016

(54) ELECTROLYSIS WATER-MAKING APPARATUS

(75) Inventors: Masayasu Shirato, Tokyo (JP); Koki Matsuyama, Tokyo (JP)

(73) Assignee: Morinaga Milk Industry Co., Ltd., Tokyo (JP)

(*) Notice: Subject to any disclaimer, the term of this patent is extended or adjusted under 35 U.S.C. 154(b) by 0 days.

(21) Appl. No.: 14/239,864

(22) PCT Filed: Jun. 12, 2012

(86) PCT No.: PCT/JP2012/065002
§ 371 (c)(1),
(2), (4) Date: Feb. 20, 2014

(87) PCT Pub. No.: WO2013/027473
PCT Pub. Date: Feb. 28, 2013

(65) Prior Publication Data
US 2014/0216926 A1    Aug. 7, 2014

(30) Foreign Application Priority Data
Aug. 24, 2011   (JP) ................. 2011-182492

(51) Int. Cl.
| | |
|---|---|
| *C25B 9/00* | (2006.01) |
| *C25B 9/06* | (2006.01) |
| *C25B 1/04* | (2006.01) |
| *C25B 9/18* | (2006.01) |
| *C02F 1/461* | (2006.01) |
| *C02F 1/467* | (2006.01) |

(52) U.S. Cl.
CPC ............ *C02F 1/46104* (2013.01); *C02F 1/467* (2013.01); *C02F 2201/4611* (2013.01)

(58) Field of Classification Search
CPC .............. C25B 9/00; C25B 1/04; C25B 9/18; C25B 9/06; C02F 2201/46115; C02F 2201/4618; C02F 1/46104
USPC .......................................... 204/193, 194, 242
See application file for complete search history.

(56) References Cited

FOREIGN PATENT DOCUMENTS

| | | |
|---|---|---|
| CN | 1240766 A | 1/2000 |
| EP | 1101544 A1 | 5/2001 |
| JP | 64-070188 A | 3/1989 |
| JP | 05-345182 A | 12/1993 |
| JP | 06-031892 A | 4/1994 |

(Continued)

OTHER PUBLICATIONS

English Translation of JP2005-138001 to Doi; Jun. 2, 2005.*

(Continued)

*Primary Examiner* — Zulmariam Mendez
(74) *Attorney, Agent, or Firm* — Wood, Herron & Evans, LLP

(57) ABSTRACT

The electrolysis water-making apparatus (A) which is an apparatus for making electrolysis water (W5) by electrolyzing a raw material solution (W1, W3) including a chlorine ion includes: an electrolytic cell (2); a raw material solution feed pump (3) used to supply the raw material solution (W1, W3) to the electrolytic cell (2); and a pipe (32, 36) connecting an outlet (3b) of the raw material solution feed pump (3) allowing the raw material solution (W1, W3) to be discharged therefrom and an inlet (26) allowing the raw material solution (W1, W3) to flow into the electrolytic cell (2). In addition, the raw material solution feed pump (3) is provided so that the outlet (3b) is disposed on a lower side of the inlet (26).

4 Claims, 17 Drawing Sheets

(56) References Cited

FOREIGN PATENT DOCUMENTS

| | | | |
|---|---|---|---|
| JP | 07-299458 A | 11/1995 |
| JP | 10-174972 A | 6/1998 |
| JP | 11-179359 A | 7/1999 |
| JP | 11-290855 A | 10/1999 |
| JP | 11-290856 A | 10/1999 |
| JP | 2000-005757 A | 1/2000 |
| JP | 2003-080256 A | 3/2003 |
| JP | 2003-190953 A | 7/2003 |
| JP | 2004-148266 A | 5/2004 |
| JP | 2005-161196 A | 6/2005 |
| JP | 2006-110512 A | 4/2006 |
| JP | 2011125614 A | 6/2011 |
| TW | 201000678 A | 1/2010 |
| TW | 201042091 A | 12/2010 |
| WO | 0181656 A2 | 11/2001 |
| WO | 2008032946 A1 | 3/2008 |
| WO | 2011/077875 A1 | 6/2011 |

OTHER PUBLICATIONS

English Translation of JP2000-005757 to Doi; Jan. 11, 2000.*

Japanese Patent Office, International Search Report issued in Application No. PCT/JP2012/065002, mailed Sep. 18, 2012, 6 pp.

Taiwanese Patent Office, Office Action issued in Application No. 101121096, mailed Aug. 15, 2013, 6 pp.

Japanese Patent Office, Notice of Reasons for Rejection issued in corresponding Japanese Patent Application No. 2013-529916 and English-language translation mailed Oct. 7, 2014 (7 pages).

The State Intellectual Property Office of P.R. China, Notification of First Ofice Action issued in corresponding Chinese Patent Application No. 201280040644.2 and English-language translation, issued Nov. 2, 2014 (15 pages).

European Search Report issued in European Patent Application No. 12825252.5, mailed Jul. 6, 2015, 6 pages.

* cited by examiner

IMMEDIATELY AFTER INJECTION

AFTER 20 HOURS

AFTER 50 HOURS

AFTER 70 HOURS

AFTER 100 HOURS

AFTER 200 HOURS

IMMEDIATELY AFTER INJECTION

AFTER 20 HOURS

AFTER 50 HOURS

AFTER 70 HOURS

AFTER 100 HOURS

AFTER 200 HOURS

ELECTROLYSIS WATER-MAKING APPARATUS

TECHNICAL FIELD

The present invention relates to an electrolysis water-making apparatus used to make electrolysis water by electrolyzing an electrolyte solution as a raw material solution including a chlorine ion.

Priority is claimed on Japanese Patent Application No. 2011-182492, filed Aug. 24, 2011, the contents of which are incorporated herein by reference.

BACKGROUND ART

Conventionally, in the food production field or the like, an electrolysis water-making apparatus electrolyzes various electrolyte solutions (a raw material solution including a chlorine ion) so as to make electrolysis-sterilized water (electrolysis water), and the electrolysis-sterilized water is used for sterilization, disinfection or the like. For example, when an electrolyte solution including a chlorine ion such as a sodium chloride solution or a hydrochloric acid solution is electrolyzed, chlorine gas is produced through electrolytic oxidation, and by dissolving the chlorine gas in water, hypochlorous acid is generated. The electrolysis-sterilized water including the generated hypochlorous acid has many advantages compared to sterilized water prepared by dissolving sodium hypochlorite in water, such as the electrolysis-sterilized water exerts an excellent sterilization effect even when the chlorine concentration thereof is low, or it is not necessary to perform delicate concentration adjustment at each time of use.

The electrolysis water-making apparatus includes an electrolytic cell used to electrolyze an electrolyte solution, and a water supply system used to supply the electrolyte solution to the electrolytic cell. In addition, as the electrolytic cell, a bipolar electrolytic cell (series electrolytic cell) in which a plurality of electrode plates are arranged in series is widely used. The bipolar electrolytic cell is configured so that a plurality of electrode plates are arranged at intervals in a casing, an anode electrode and a cathode electrode are connected using welding to the electrode plate at one end in the axial direction thereof and to the electrode plate at the other end respectively, and electricity is conducted from the electrode plate (anode) at the one end via intermediate electrode plates to the electrode plate (cathode) at the other end.

In the electrolysis water-making apparatus, the water supply system supplies an electrolyte solution into the casing of the electrolytic cell, an electric current flows by applying a predetermined voltage to the electrolyte solution including chloride while the electrolyte solution is circulated, and chlorine gas is generated through oxidation reaction at the anode. The chlorine gas (or a liquid in which the chlorine gas is mixed) is taken out from the electrolytic cell and is mixed with water, whereby hypochlorous acid is generated in the water, and electrolysis-sterilized water is made.

In addition, when the voltage applied between the electrodes of the electrolytic cell is cut off, thereby stopping electrolysis, and when a pump to supply an electrolyte solution to the electrolytic cell is stopped, an electrolyzed solution in which high-concentration chlorine gas or hypochlorous acid, non-electrolyzed hydrochloric acid, or the like is mixed remains in the electrolytic cell (in the present invention, such a remaining liquid in the electrolytic cell is referred to as the electrolyzed solution). When operations of the electrolytic cell and the pump are stopped, the electrolyzed solution in the electrolytic cell may flow back into a pipe (tube) connecting the electrolytic cell and the pump. By the flowback of the electrolyzed solution, corrosion of component parts such as a pump may occur due to chlorine gas or the like, and the lives of the component parts may be shortened.

Contrary to this, in the related art, a means of providing a check valve in a pipe connecting the electrolytic cell and the pump or a means of controlling the pump so that the operation of the pump used to supply an electrolyte solution is stopped after a lapse of a predetermined time in a state where the voltage applied between the electrodes of the electrolytic cell is stopped is adopted. Accordingly, the flowback of the electrolyzed solution from the electrolytic cell is prevented (for example, refer to Patent Document 1).

DOCUMENT OF RELATED ART

Patent Document

[Patent Document 1] Japanese Unexamined Patent Application, First Publication No. H7-299458

SUMMARY OF INVENTION

Technical Problem

However, in spite of adopting a means to prevent the flowback of an electrolyzed solution in the electrolytic cell using a non-return mechanism such as a check valve, there is a case where the electrolyzed solution intrudes from the electrolytic cell into the pipe immediately after the operation of the electrolysis water-making apparatus has stopped, and thus the corrosion of component parts such as a check valve, a pump, a pipe (tube), a gasket, or an O-ring occurs.

It has been confirmed from the corrosion state or the like of the component parts, that this phenomenon is not caused only due to the flowback of the electrolyzed solution, or due to mere diffusion associated with concentration equilibrium. Therefore, it is strongly desired that the cause thereof be clarified and a means to prevent the corrosion of component parts be adopted.

On the other hand, in the operation of the electrolysis water-making apparatus, there is the following problem. In the related art, when the operation of electrolysis is restarted (operated) from a state of a halt thereof during operation of the electrolysis water-making apparatus, there is a case where the entire apparatus is stopped by error due to the occurrence of overcurrent in the electrolysis cell. The prevention of such an error stop state is essential to stably operate the electrolysis water-making apparatus. The prevention of such an error stop state is also an issue in the electrolysis water-making apparatus.

Solution to Problem

According to a first aspect of the present invention, an electrolysis water-making apparatus which is an apparatus for making electrolysis water by electrolyzing a raw material solution including a chlorine ion includes: an electrolytic cell; a raw material solution feed pump used to supply the raw material solution to the electrolytic cell; and a pipe connecting an outlet of the raw material solution feed pump allowing the raw material solution to be discharged therefrom and an inlet allowing the raw material solution to flow into the electrolytic cell. In addition, the raw material solution feed pump is provided so that the outlet is disposed on a lower side of the inlet.

According to a second aspect of the present invention, in the first aspect, the electrolysis water-making apparatus further includes: a dilution water pump used to supply dilution water to be mixed in the raw material solution so that the raw material solution has a predetermined electrolyte concentration; and a second pipe connecting a second outlet of the dilution water pump allowing the dilution water to be discharged therefrom and a second inlet allowing the dilution water to flow into the electrolytic cell. In addition, the dilution water pump is provided so that the second outlet is disposed on an upper side of the second inlet.

According to a third aspect of the present invention, in the first aspect, the electrolysis water-making apparatus further includes a bracket fixed to the electrolytic cell so as to be attachable and detachable. In addition, the bracket is provided with a pump-positioning-holding section to which the raw material solution feed pump is fixed so as to be attachable and detachable and which positions and holds the raw material solution feed pump so that the outlet is disposed in a predetermined position with respect to the inlet.

According to a fourth aspect of the present invention, in the second aspect, the electrolysis water-making apparatus further includes a second bracket fixed to the electrolytic cell so as to be attachable and detachable. In addition, the second bracket is provided with a second pump-positioning-holding section to which the dilution water pump is fixed so as to be attachable and detachable and which positions and holds the dilution water pump so that the second outlet is disposed in a predetermined position with respect to the second inlet.

Effects of Invention

The inventor clarified, as described below, that the cause of a phenomenon is advection of the electrolyzed solution, wherein the phenomenon is that an electrolyzed solution intrudes from the electrolytic cell into the pipe after the operation of the electrolysis water-making apparatus has stopped in spite of preventing the flowback of the electrolyzed solution in the electrolytic cell by the non-return mechanism. Based on this, in the electrolysis water-making apparatus of the first aspect of the present invention, the raw material solution feed pump is provided so that the outlet of the raw material solution feed pump is disposed on the lower side of the inlet of the electrolytic cell. Therefore, it is possible to prevent an electrolyzed solution from being advected from the electrolytic cell into the pipe connected to the raw material solution feed pump immediately after the operation thereof has stopped.

As a result, the corrosion of component parts due to an electrolyzed solution can be prevented, and it is possible to extend the lives of the component parts. In addition, it is possible to decrease frequency of replacement of the component parts, and to provide an electrolysis water-making apparatus having excellent durability, economic efficiency, and reliability.

In addition, the inventor clarified that the cause of the phenomenon in which an electrolyzed solution intrudes from the electrolytic cell into a pipe is advection of the electrolyzed solution. Furthermore, together with such a phenomenon in which an electrolyzed solution is advected from the electrolytic cell to the pipe, it was found that a phenomenon occurs in which a raw material solution or dilution water is advected from a pipe to the electrolytic cell in an opposite manner. It was ascertained that such advection of the raw material solution or the dilution water from the pipe to the electrolytic cell causes skewed distribution in the up-and-down direction of a chlorine ion concentration in the electrolytic cell, and as a result of the skewed distribution, the error stop state is caused due to occurrence of overcurrent in the electrolytic cell when the electrolysis in a halt state is restarted.

Accordingly, the arrangement of the raw material solution feed pump as described above prevents the phenomenon in which an electrolyzed solution is advected from the electrolytic cell toward a raw material solution pipe, and prevents the phenomenon in which a raw material solution is advected from the raw material solution pipe toward the electrolytic cell in an opposite manner. Therefore, it is possible to prevent the skewed distribution of a chlorine ion concentration in the electrolytic cell. As a result, it is possible to prevent occurrence of overcurrent when the operation of the electrolytic cell is restarted and to prevent the error stop state of the apparatus associated with it, and to provide an electrolysis water-making apparatus capable of more stably operating.

In the electrolysis water-making apparatus of the second aspect of the present invention, based on the cause of the above phenomenon clarified by the inventor, the dilution water pump is provided so that the second outlet of the dilution water pump is disposed on the upper side of the second inlet of the electrolytic cell. Therefore, it is possible to prevent an electrolyzed solution from being advected from the electrolytic cell into the second pipe connected to the dilution water pump immediately after the operation thereof has stopped.

As a result, the corrosion of component parts due to an electrolyzed solution can be prevented, and it is possible to further extend the lives of the component parts. In addition, it is possible to decrease frequency of replacement of the component parts, and to provide an electrolysis water-making apparatus having further excellent durability, economic efficiency, and reliability.

In addition, the arrangement of the dilution water pump as described above prevents the phenomenon in which an electrolyzed solution is advected from the electrolytic cell toward a dilution water pipe (second pipe), and prevents the phenomenon in which dilution water is advected from the dilution water pipe toward the electrolytic cell in an opposite manner. Therefore, it is possible to prevent the skewed distribution of a chlorine ion concentration in the electrolytic cell. As a result, it is possible to prevent occurrence of overcurrent when the operation of the electrolytic cell is restarted and to prevent the error stop state of the apparatus associated with it, and to provide an electrolysis water-making apparatus capable of more stably operating.

In the electrolysis water-making apparatus of the third or fourth aspect of the present invention, the raw material solution feed pump or the dilution water pump is simply fixed to a pump-positioning-holding section of a bracket so as to be attachable and detachable, and thus the raw material solution feed pump or the dilution water pump can be easily provided so that an outlet thereof is disposed in a predetermined position with respect to an inlet of the electrolytic cell for a raw material solution or dilution water. In addition, since the raw material solution feed pump or the dilution water pump is fixed to the bracket so as to be attachable and detachable, it is also possible to improve the maintainability thereof.

DESCRIPTION OF EMBODIMENTS

Hereinafter, an electrolysis water-making apparatus related to an embodiment of the present invention is described with reference to FIGS. 1 to 13B. This embodiment relates to an electrolysis water-making apparatus for making electrolysis water by electrolyzing an electrolyte solution as a raw material solution including a chlorine ion, and in particular, to an electrolysis water-making apparatus for making electrolysis-sterilized water including hypochlorous acid.

Figure 1:
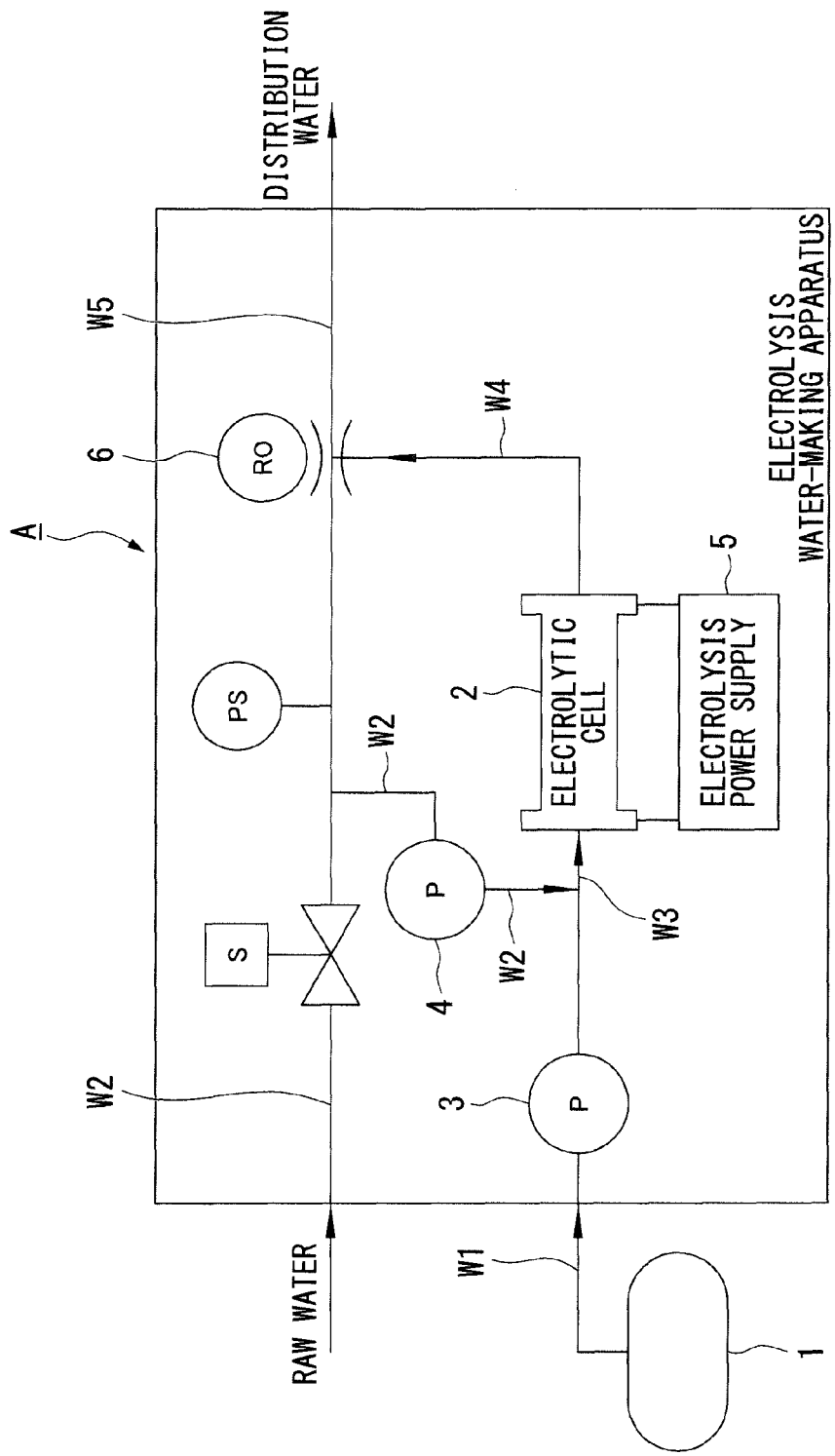
FIG. 1 is a diagram showing an electrolysis water-making apparatus related to an embodiment of the present invention.

As shown in FIG. 1, an electrolysis water-making apparatus A of this embodiment includes a tank 1 storing an undiluted solution W1 (a raw material solution including a chlorine ion) such as a hydrochloric acid solution or a sodium chloride solution, an electrolytic cell 2 to which an electrolyte solution W3 (a raw material solution including a chlorine ion) composed by mixing the undiluted solution W1 and water W2 (dilution water) is supplied and which electrolyzes the electrolyte solution W3, and a raw material solution feed pump 3 used to feed the undiluted solution W1 from the tank 1 to the electrolytic cell 2. Furthermore, the electrolysis water-making apparatus A includes a dilution water pump 4 which feeds the water W2 between the tank 1 and the electrolytic cell 2 so as to dilute the undiluted solution W1 to have a predetermined concentration and thus which produces the electrolyte solution W3, an electrolysis power supply 5 used to supply electric power to the electrolytic cell 2, and a mixer 6 used to produce electrolysis-sterilized water W5 (electrolysis water) by mixing chlorine gas (or an electrolyzed solution W4 in which the chlorine gas is mixed) and treated water W2 together, wherein the chlorine gas is generated by electrolyzing the electrolyte solution W3 at the electrolytic cell 2.

Figure 2:
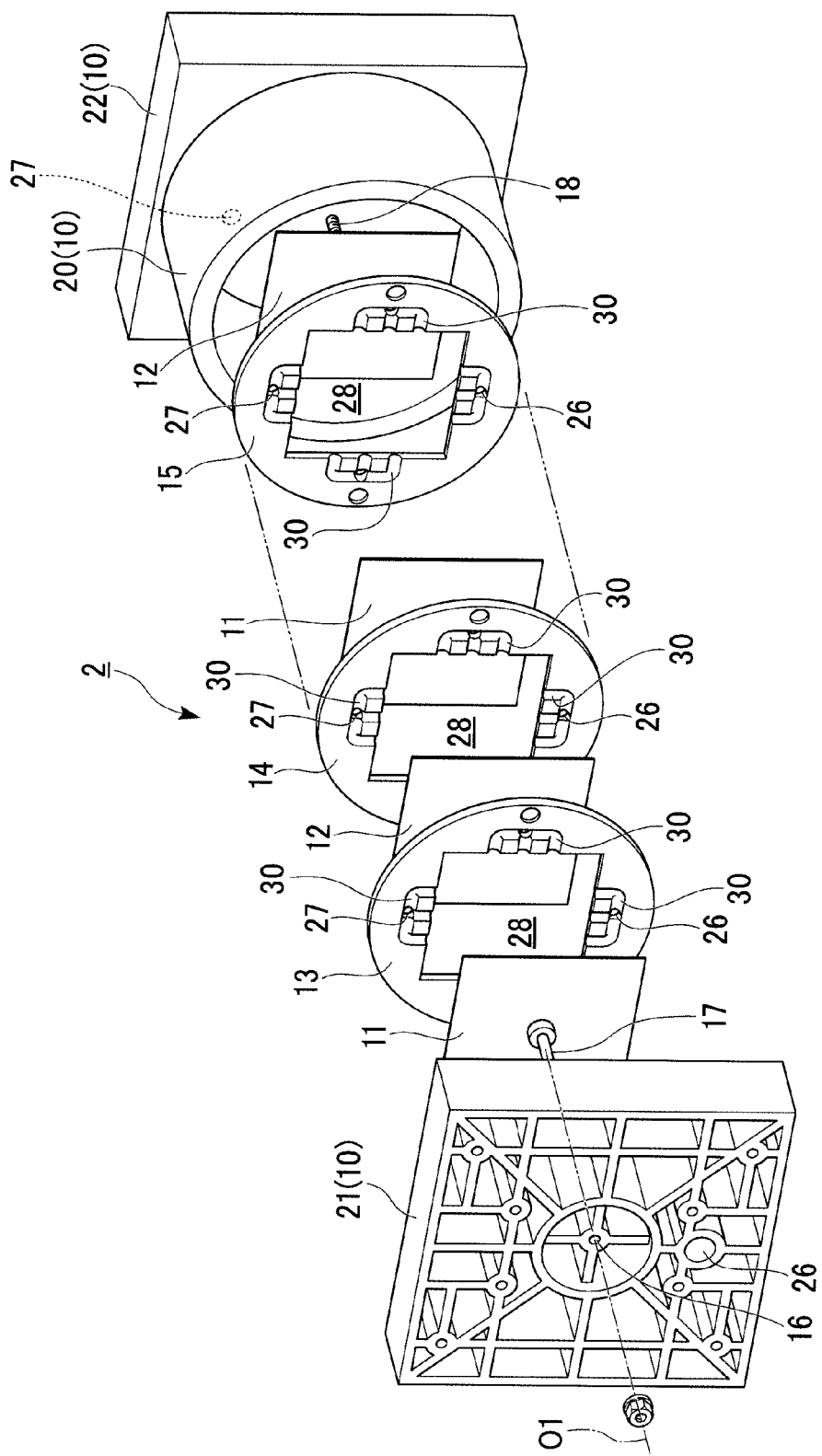
FIG. 2 is an exploded perspective view showing an electrolytic cell of the electrolysis water-making apparatus related to the embodiment of the present invention.

The electrolytic cell 2 is a bipolar electrolytic cell in which a plurality of electrode plates are arranged in series. As shown in FIGS. 1 and 2, the electrolytic cell 2 includes a casing 10 allowing the electrolyte solution W3 to flow therein, a plurality of electrode plates 11 and 12 arranged at intervals in a direction of an axis O1 inside the casing 10, a plurality of spacers 13, 14 and 15 holding the electrode plates 11 and 12 in a state where the electrode plates 11 and 12 are arranged at intervals in the direction of the axis O1, a pair of electrodes 17 and 18 used to supply electric power from the electrolysis power supply 5 to the electrode plates 11 and 12, wherein the electrodes 17 and 18 are provided so as to be inserted in electrode through-holes 16 penetrating the center part of the casing 10 from the outside to the inside thereof, and are connected to a pair of electrode plates 11 and 12 positioned at both ends in the direction of the axis O1, respectively.

The casing 10 is formed using plastics such as polyvinyl chloride resin, polycarbonate resin, or polyacrylate acrylate resin. As shown in FIG. 2, the casing 10 includes a cylindrical body 20 in which the central axis thereof is disposed in the direction of the axis O1, and a pair of side plates 21 and 22 integrally fixed to both ends in the direction of the axis O1 of the body 20 so as to seal openings of the body 20.

In one side plate 21, an inlet 26 penetrating a portion near the lower end (a lower side of the electrode through-hole 16) of the side plate 21 from the outer surface to the inner surface thereof is formed so as to open in the direction of the axis O1. In the other side plate 22, an outlet 27 penetrating a portion near the upper end (an upper side of the electrode through-hole 16) of the side plate 22 from the outer surface to the inner surface thereof is formed so as to open in the direction of the axis O1.

The plurality of electrode plates 11 and 12 are plates composed of metal such as titanium alloy, and each electrode plate is formed into a square plate shape. In addition, the electrode plates 11 and 12 are arranged between the side plates 21 and 22 disposed to face each other with a predetermined space, so that each plate surface of the electrode plates 11 and 12 is perpendicular to the facing direction (the direction of the axis O1) of the side plates 21 and 22. The electrodes 17 and 18 composed of metal are fixed and connected to the center parts of the electrode plates 11 and 12 disposed at both ends in the direction of the axis O1.

The plurality of spacers 13, 14 and 15 are formed into an approximately circular plate shape having an outer diameter approximately the same as the inner diameter of the body 20 of the casing 10. Each of the spacers 13, 14 and 15 is provided with a square-shaped through-hole penetrating the center part of each spacer from one surface to the other surface thereof, wherein the through-hole composes an electrolysis chamber 28. In addition, each of the spacers 13, 14 and 15 is provided with an outlet 27 penetrating a portion above the through-hole (28) from one surface to the other surface thereof, and with an inlet 26 penetrating a portion below the through-hole (28) from one surface to the other surface thereof. Each of the outlet 27 and the inlet 26 communicates with the through-hole via a groove-shaped fluid channel 30 formed on the one surface, wherein the through-hole composes the electrolysis chamber 28.

As shown in FIGS. 1 to 4, the raw material solution feed pump 3 as a water supply system of this embodiment is provided so that a tube 31 connects the tank 1 and an inlet 3a allowing the undiluted solution W1 to flow thereinto, and so that a tube 32 (pipe) and a tube 36 (pipe) connect an outlet 3b (outlet) allowing the undiluted solution W1 to be discharged therefrom and the inlet 26 allowing the electrolyte solution W3 to flow into the electrolysis chambers 28 of the electrolytic cell 2. The dilution water pump 4 is provided so that a tube 33 connects a raw water source and an inlet 4a allowing the water W2 to flow thereinto, and so that a tube 34 (second pipe) and the tube 36 (second pipe) connect an outlet 4b (second outlet) allowing the water W2 to be discharged therefrom and the inlet 26 (second inlet) of the electrolytic cell 2.

As the raw material solution feed pump 3 and the dilution water pump 4 as a water supply system of this embodiment, tube pumps are used. That is, in the electrolysis water-making apparatus A of this embodiment, the raw material solution feed pump 3 or the dilution water pump 4 stops in a state of pinching a tube at the same time as the operation stops, and thereby a non-return function is exerted. Therefore, a check valve in the related art is not provided in a piping route connecting the outlet 3b of the raw material solution feed pump 3 or the outlet 4b of the dilution water pump 4 to the inlet 26 of the electrolytic cell 2. In addition, it is more effective and preferable that the present invention be applied to an apparatus of a closed system provided with such a non-return mechanism.

In this embodiment, each of the tubes 32 and 34 connected to the outlet 3b of the raw material solution feed pump 3 and to the outlet 4b of the dilution water pump 4 respectively is connected to a T-fitting 35 (refer to FIG. 4), and the tube 36 (a pipe, a second pipe) connects the T-fitting 35 and the inlet 26 (an inlet, a second inlet) of the electrolytic cell 2. Therefore, the undiluted solution W1 and the dilution water W2 are mixed together at the T-fitting 35, thereby producing the electrolyte solution W3, and the electrolyte solution W3 is supplied to the electrolytic cell 2.

In addition, in this embodiment, the tubes 32 and 36 connecting the outlet 3b of the raw material solution feed pump 3 and the inlet 26 of the electrolytic cell 2 can be regarded as one pipe. Similarly, the tubes 34 and 36 connecting the outlet 4b of the dilution water pump 4 and the inlet 26 of the electrolytic cell 2 can be regarded as one pipe (second pipe). In addition, the inlet 26 has both functions as an inlet allowing the undiluted solution W1 to flow into the electrolytic cell 2 and as an inlet (second inlet) allowing the water W2 to flow into the electrolytic cell 2.

In this embodiment, the raw material solution feed pump 3 is arranged so that the outlet 3b of the raw material solution feed pump 3 is disposed on the lower side of the inlet 26 of the electrolytic cell 2. In other words, the outlet 3b is positioned below a horizontal plane in which the inlet 26 is positioned. In addition, the dilution water pump 4 is arranged so that the outlet 4b of the dilution water pump 4 is disposed on the upper side of the inlet 26 of the electrolytic cell 2. In other words, the outlet 4b is positioned above a horizontal plane in which the inlet 26 is positioned.

Figure 3:
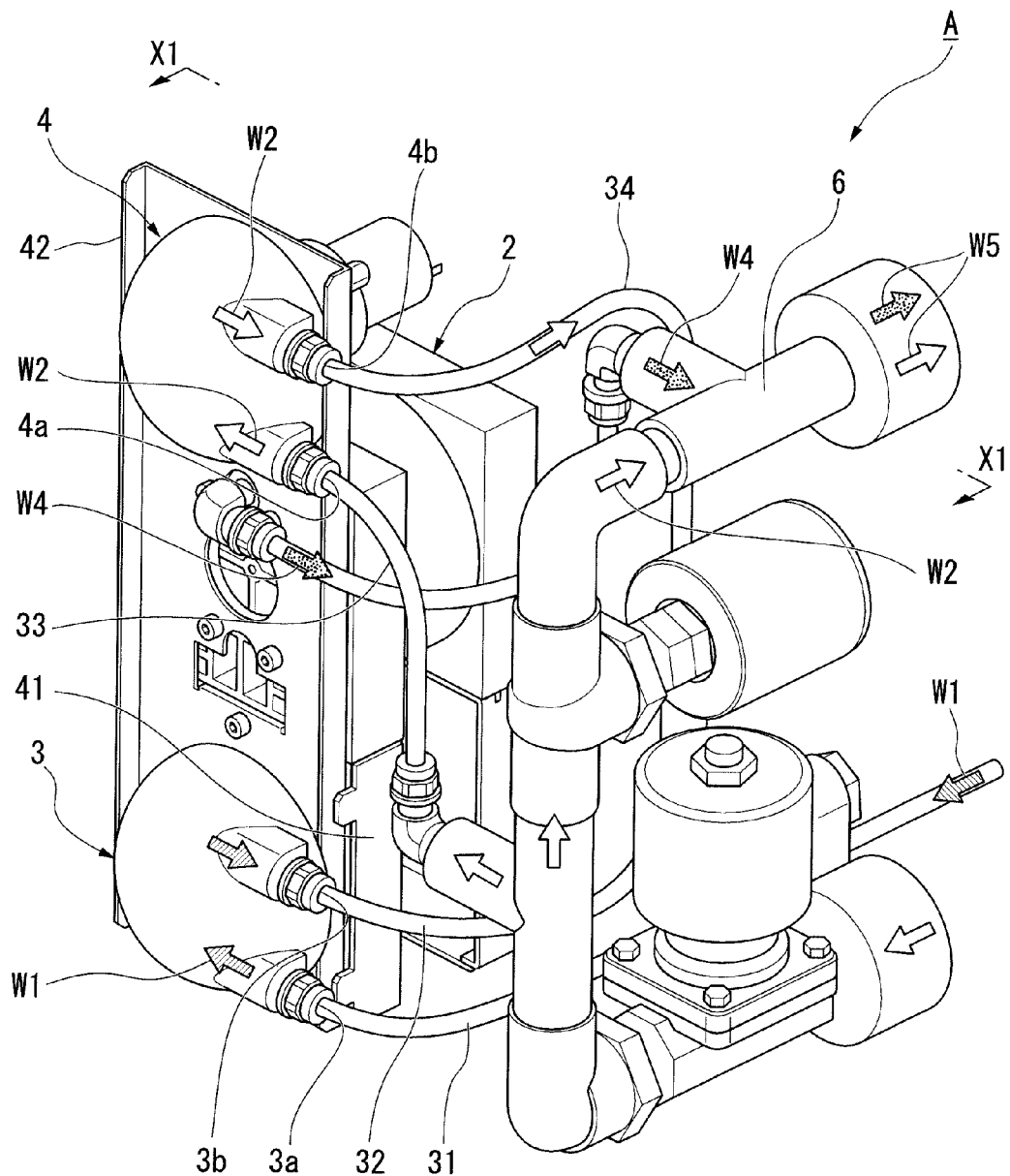
FIG. 3 is a perspective view showing the electrolysis water-making apparatus related to the embodiment of the present invention.
Figure 4:
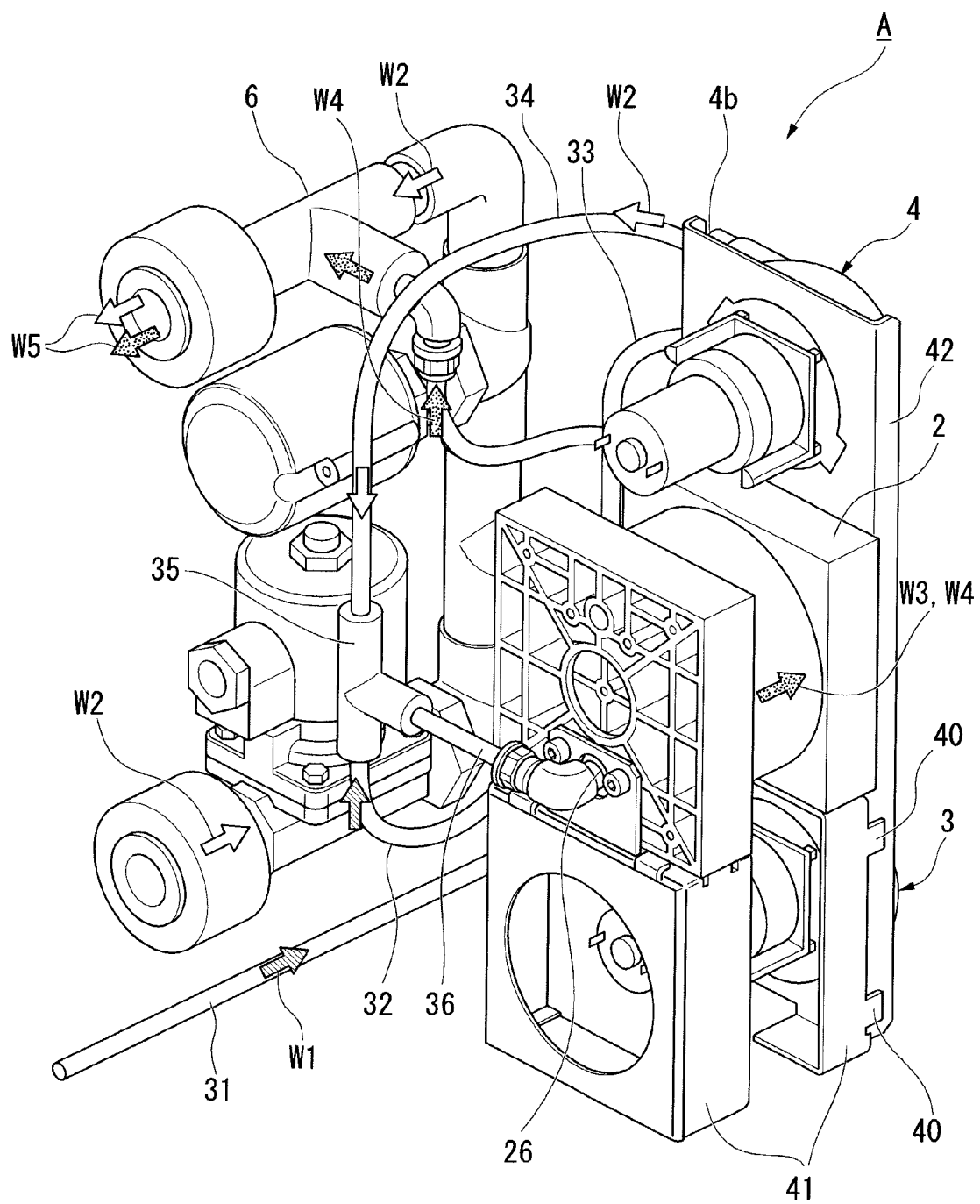
FIG. 4 is a view viewed in an arrow direction of an X1-X1 line in FIG. 3.
Figure 5:
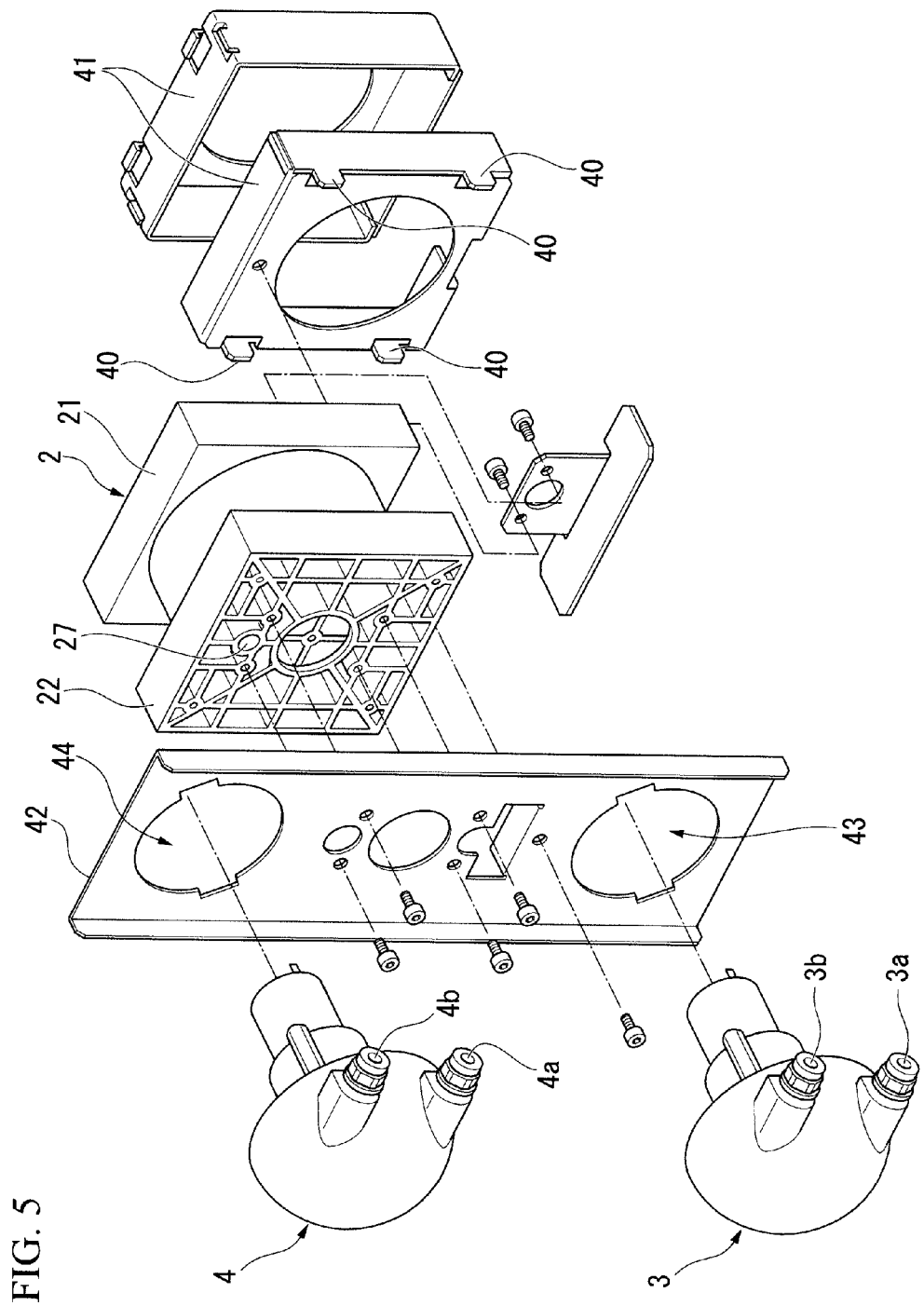
FIG. 5 is an exploded perspective view showing the electrolysis water-making apparatus related to the embodiment of the present invention.

As shown in FIGS. 3 to 5, the electrolysis water-making apparatus A of this embodiment includes an electrolytic cell bracket 41 which is fixed to the lower ends of the side plates 21 and 22 of the electrolytic cell 2 using fixed nails 40 so as to be attachable and detachable and which supports the electrolytic cell 2, and a pump bracket 42 (a bracket, a second bracket) which is fixed to one side plate 22 of the electrolytic cell 2 using screws or the like so as to be attachable and detachable, which is fixed to the electrolytic cell bracket 41 using fixed nail 40 so as to be attachable and detachable, and which is used to arrange the raw material solution feed pump 3 and the dilution water pump 4 in predetermined positions.

The pump bracket 42 includes a pump-positioning-holding hole 43 (pump-positioning-holding section) which allows the raw material solution feed pump 3 to be fixed thereto to be attachable and detachable by inserting and engaging the raw material solution feed pump 3 thereinto and which positions and holds the raw material solution feed pump 3, and a pump-positioning-holding hole 44 (second pump-positioning-holding section) which allows the dilution water pump 4 to be fixed thereto to be attachable and detachable by inserting and engaging the dilution water pump 4 thereinto and which positions and holds the dilution water pump 4. The raw material solution feed pump 3 and the dilution water pump 4 are simply fixed to the pump bracket 42 by engaging them with the pump-positioning-holding holes 43 and 44 respectively, and thus the outlets 3b and 4b of the pumps 3 and 4 are disposed in predetermined positions with respect to the inlet 26 of the electrolytic cell 2.

In the electrolysis water-making apparatus A of this embodiment having the above-described configuration, the electrolysis power supply 5 supplies electric power to the electrodes 17 and 18 of the electrolytic cell 2, the undiluted solution W1 is fed from the tank 1 through the operation of the raw material solution feed pump 3, and the water W2 is fed from a water source through the operation of the dilution water pump 4. The undiluted solution W1 and the dilution water W2 which have flowed through the tubes 32 and 34 respectively are mixed together at the T-fitting 35, and the electrolyte solution W3 which has been adjusted to have a predetermined electrolyte concentration is supplied through the inlet 26 of the electrolytic cell 2 into the electrolysis chambers 28 inside the casing 10, and flows therein.

When the electrolyte solution W3 flows through the electrolysis chambers 28 in a state where electric power is supplied to the electrodes 17 and 18, chlorine gas is generated through electrolysis. The chlorine gas (or the electrolyzed solution W4 in which the chlorine gas is mixed) is taken out from the outlet 27 of the electrolytic cell 2 and is mixed with the treated water W2 at the mixer 6, whereby the electrolysis-sterilized water W5 is produced.

In an electrolysis water-making apparatus in the related art, the electrolyzed solution W4 may be advected from the electrolytic cell 2 into the tubes 32 and 34 immediately after the operation thereof is stopped. Accordingly, in a case where tube pumps are used as the pumps 3 and 4 as in this embodiment, deterioration such as discoloration or swelling of a tube may occur. On the other hand, in a case where a check valve is used, a life or the like of a gasket or a valve body may be shortened.

Contrary to this, in order to clarify this phenomenon, the inventor carried out first and second experiments of electrolyzed solution behavior.

First, the first experiment of electrolyzed solution behavior is described with reference to FIGS. 6A to 6D and 7A to 7D. In the first experiment of electrolyzed solution behavior, the experiment was carried out in accordance with a procedure shown in the following (1) to (5).

(1) 10-ml test tubes 45 and 46 were prepared in threes, and water (tap water), 3% hydrochloric acid solution, and 21% hydrochloric acid solution were injected into the test tubes 45 or 46 in 5-ml volumes. The three test tubes 45 are referred to as a first set, and the three test tubes 46 are referred to as a second set.

(2) 3% hydrochloric acid solution was used as the electrolyte solution W3, the electrolysis water-making apparatus A was continuously operated for 3 hours after the electrolyte solution W3 was supplied into the electrolytic cell 2, and the electrolyzed solution W4 was obtained from the electrolytic cell 2 after the continuous operation. In the obtained electrolyzed solution W4, the available chlorine concentration thereof was 265.5 ppm.

(3) After the obtained electrolyzed solution W4 was cooled to room temperature, potassium iodide was added thereto, and the electrolyzed solution W4 was stained by reacting the potassium iodide with hypochlorous acid in the electrolyzed solution W4. The electrolyzed solution W4 after staining is referred to as the stained electrolyzed solution W4'.

Figure 6A:
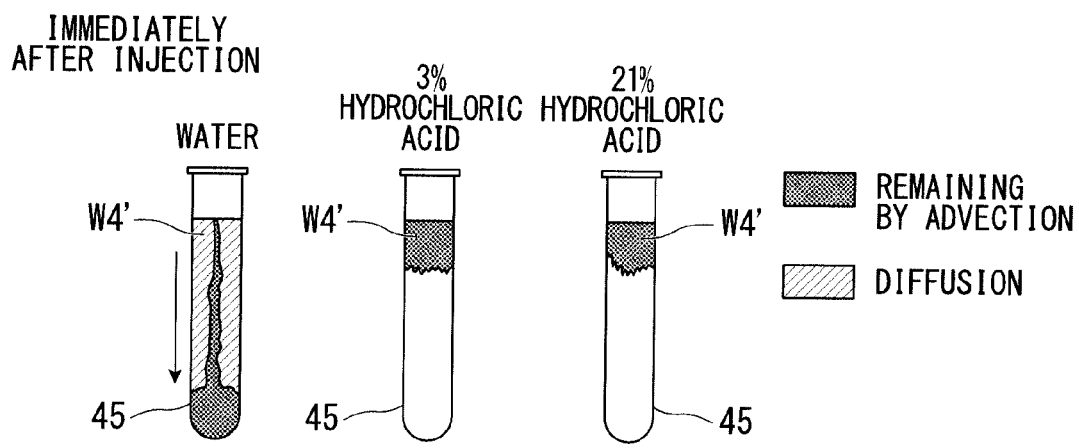
FIG. 6A is a view showing a state immediately after an electrolyzed solution is injected, in a first experiment of electrolyzed solution behavior.
Figure 7A:
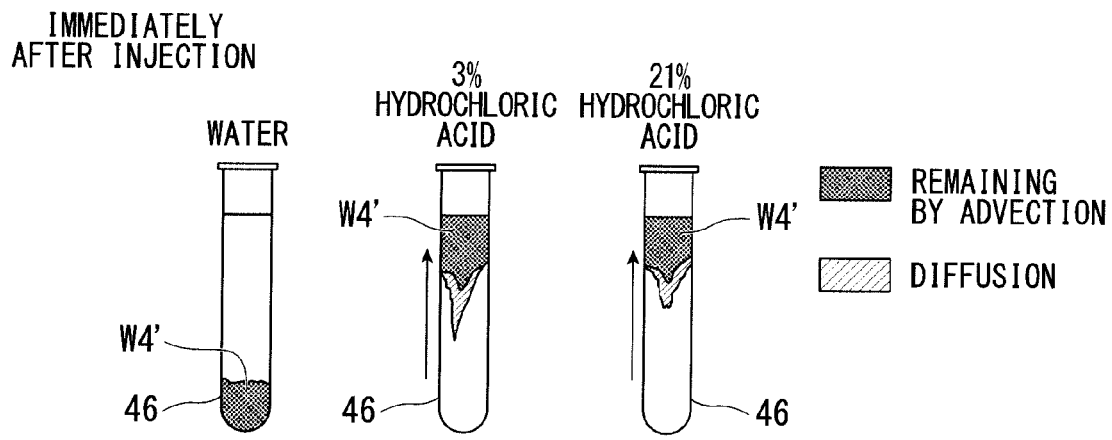
FIG. 7A is a view showing a state immediately after an electrolyzed solution is injected, in a first experiment of electrolyzed solution behavior.

(4) 1 ml of the stained electrolyzed solution W4' was injected into each of the test tubes 45 and 46 of (1). FIGS. 6A and 7A show a state immediately after the stained electrolyzed solution W4' was injected. At this time, as shown in FIG. 6A, in the three test tubes 45 (first set), the stained electrolyzed solution W4' was added (injected) to the surface of the solution from an upper part inside the test tube 45. In addition, as shown in FIG. 7, in the three test tubes 46 (second set), the stained electrolyzed solution W4' was added to the bottom of the solution inside the test tube 46.

Figure 6B:
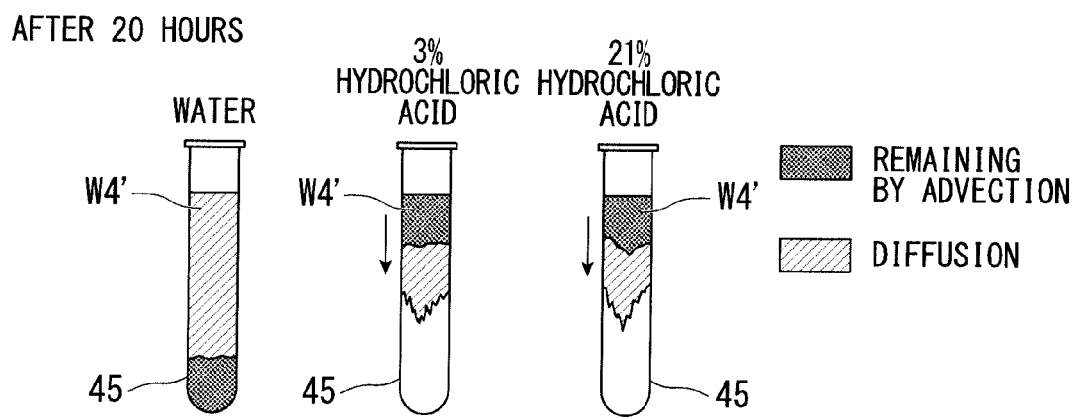
FIG. 6B is a view showing a state after a lapse of 20 hours in the first experiment of electrolyzed solution behavior.
Figure 6C:
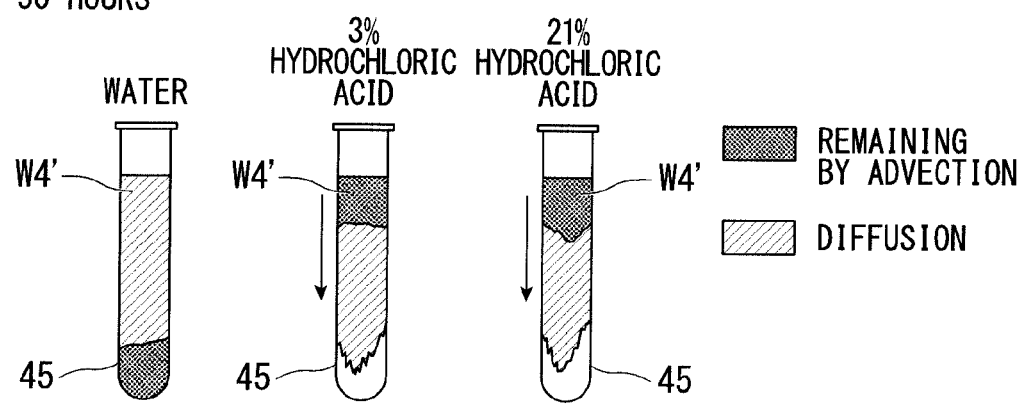
FIG. 6C is a view showing a state after a lapse of 50 hours in the first experiment of electrolyzed solution behavior.
Figure 6D:
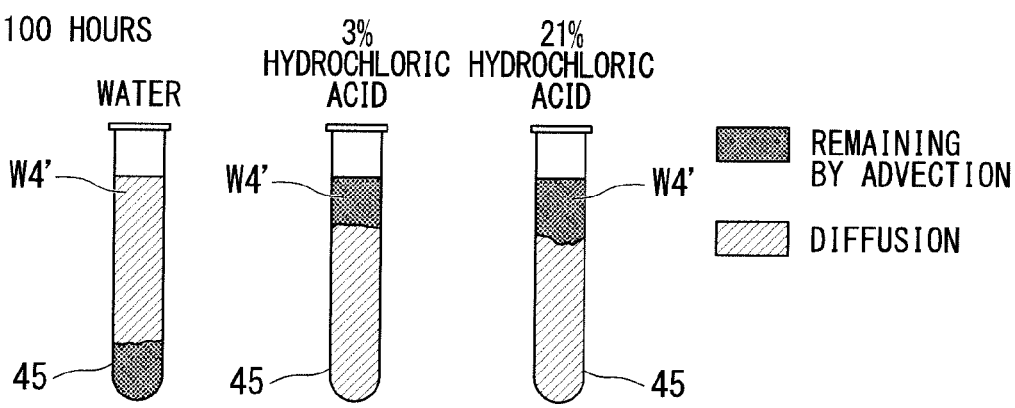
FIG. 6D is a view showing a state after a lapse of 100 hours in the first experiment of electrolyzed solution behavior.
Figure 7B:
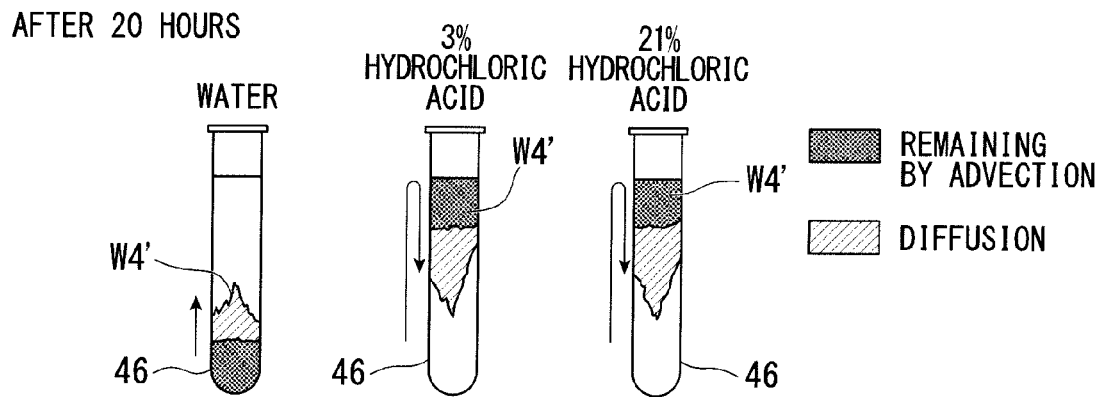
FIG. 7B is a view showing a state after a lapse of 20 hours in the first experiment of electrolyzed solution behavior.
Figure 7C:
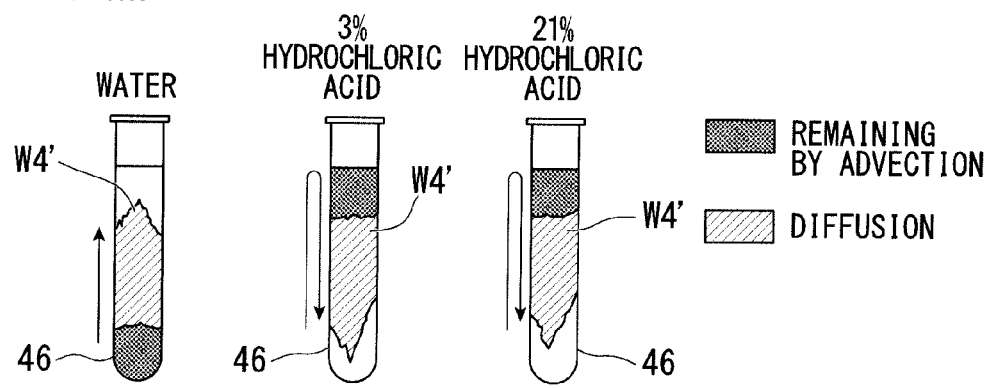
FIG. 7C is a view showing a state after a lapse of 50 hours in the first experiment of electrolyzed solution behavior.
Figure 7D:
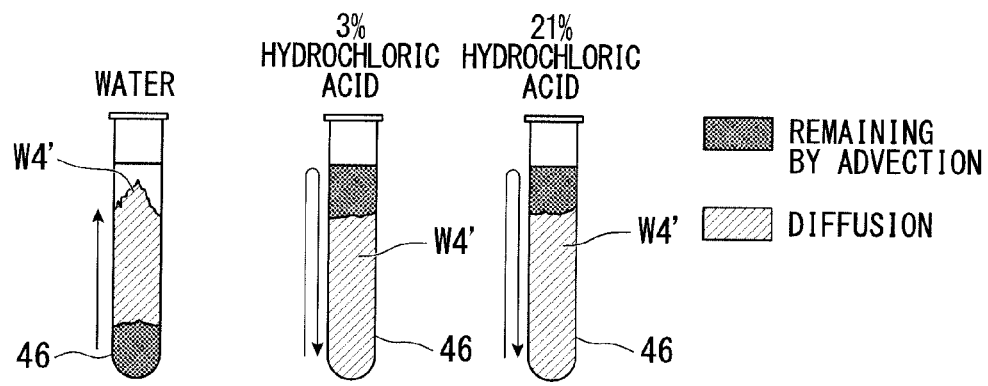
FIG. 7D is a view showing a state after a lapse of 100 hours in the first experiment of electrolyzed solution behavior.

(5) In a state where the test tubes 45 and 46 were allowed to stand still, temporal change of a colored state was observed and recorded after a lapse of 20 hours, 50 hours, or 100 hours from the time the stained electrolyzed solution W4' was injected. FIGS. 6B and 7B show a state after a lapse of 20 hours, FIGS. 6C and 7C show a state after a lapse of 50 hours, and FIGS. 6D and 7D show a state after a lapse of 100 hours.

In the first experiment of electrolyzed solution behavior, as shown in FIGS. 6A to 6D, when the stained electrolyzed solution W4' was added to the surface of water, the electrolyzed solution W4' was advected toward the bottom of the test tube 45 while diffusing, and settled in the bottom. The electrolyzed solution W4' did not completely diffuse immediately after the addition, but diffused in the entire interior of the test tube over time. However, the settling of the advected electrolyzed solution W4' was observed even after a lapse of 100 hours. On the other hand, when the stained electrolyzed solution W4' was added to each surface of 3% hydrochloric acid solution and 21% hydrochloric acid solution, the stained electrolyzed solution W4' was not advected after the addition, but remained near the surface of the solution. In addition, a state was observed in which the electrolyzed solution W4' gradually diffused downward over time.

In addition, as shown in FIGS. 7A to 7D, when the stained electrolyzed solution W4' was added to the bottom of water, the stained electrolyzed solution W4' was not advected after the addition, but remained at the bottom of the test tube 46. A state was confirmed in which the advection did not occur but the diffusion only occurred, and the electrolyzed solution W4' gradually diffused upward over time, but did not diffuse in the entire interior of the test tube even after a lapse of 100 hours. On the other hand, when the stained electrolyzed solution W4' was added to each bottom of 3% hydrochloric acid solution and 21% hydrochloric acid solution, a state was observed in which the stained electrolyzed solution W4' was advected toward the surface of the solution while slightly diffusing after the addition, immediately went up to the surface of the solution through the advection, briefly remained at the surface of the solution, and thereafter diffused downward with the passage of time.

From the above experimental results, it was confirmed that the electrolyzed solution W4' is easily advected downward in water and easily remains at the bottom of water, and the electrolyzed solution W4' is easily advected upward in hydrochloric acid solution and easily remains at the surface of the solution. In addition, it was confirmed that the electrolyzed solution W4' gradually diffused in the entire interior with the passage of time.

As shown in FIGS. 6A to 6D and 7A to 7D, the advection of the electrolyzed solution W4' occurs in the vertical direction due to a difference of densities. Table 1 shows specific gravity of water, hydrochloric acid, and an electrolyzed solution which were used in the experiment. In the hydrochloric acid and the electrolyzed solution shown in Table 1, the specific gravity of the hydrochloric acid is greater than that of the electrolyzed solution without reference to the concentration of the hydrochloric acid. Therefore, the electrolyzed solution W4' in the hydrochloric acid solution showed the behavior (not diffusion, but advection) of going up to the surface of the solution immediately after the addition.

TABLE 1

| | SAMPLING NUMBER | | | | | | STANDARD |
| --- | --- | --- | --- | --- | --- | --- | --- |
| | 1 | 2 | 3 | 4 | 5 | AVERAGE | DEVIATION |
| WATER | 1.0003 | 0.9968 | 0.9853 | 1.0015 | 0.9907 | 0.9949 | 0.006101 |
| 3% HCl | 0.9989 | 1.0225 | 1.0085 | 1.0086 | 1.0057 | 1.0088 | 0.007687 |
| 21% HCl | 1.0938 | 1.0879 | 1.0889 | 1.0840 | 1.0719 | 1.0853 | 0.007392 |
| ELECTROLYZED SOLUTION | 0.9927 | 0.9810 | 0.9746 | 0.9793 | 0.9803 | 0.9816 | 0.005992 |

DESCENDING ORDER OF SPECIFIC GRAVITY
21% HCl > 3% HCl > WATER > ELECTROLYZED SOLUTION

Between water and the electrolyzed solution W4', the reaction of $H_2O + Cl_2 \rightarrow HClO + HCl$ occurs at a contact region thereof, chlorine gas dissolving in the electrolyzed solution W4' reacts with water, and thus hypochlorous acid molecules are produced. The specific gravity of the reactant (hypochlorous acid water) of water and the electrolyzed solution W4' becomes greater than that of water.

Accordingly, when the electrolyzed solution W4' was added to the surface of water as shown in FIGS. 6A to 6D, chlorine molecules in the electrolyzed solution W4' reacted with water molecules, thereby producing hypochlorous acid molecules, and the coloration associated with the reaction between hypochlorous acid and potassium iodide showed the behavior (advection with diffusion) of settling to the bottom of water.

In addition, when the electrolyzed solution W4' was added to the bottom of water as shown in FIGS. 7A to 7D, chlorine molecules in the electrolyzed solution reacted with water molecules, thereby producing hypochlorous acid molecules, the specific gravity of the reactant became greater than that of water, and therefore the behavior (advection) of remaining at the bottom of water was shown. To be precise, until the chemical equation reaches the equilibrium, the reversible reaction of chlorine gas and hypochlorous acid is repeated.

Next, the second experiment of electrolyzed solution behavior is described with reference to FIGS. 8A to 8F and 9A to 9F. In the second experiment of electrolyzed solution behavior, the experiment was carried out in accordance with a procedure shown in the following (1) to (8).

(1) A PFA tube (fluorine resin tube) was heated using a burner, and was formed into a U-shape having a height of 150 mm. Water or 3% hydrochloric acid solution was filled (injected) thereinto.

(2) One end of the PFA tube filled with water or 3% hydrochloric acid solution was melted using a burner, thereby sealing the one end.

(3) 3% hydrochloric acid solution was used as the electrolyte solution W3, the electrolysis water-making apparatus A was continuously operated for 3 hours after the electrolyte solution W3 was supplied into the electrolytic cell 2, and the electrolyzed solution W4 was obtained from the electrolytic cell 2 after the continuous operation. In the obtained electrolyzed solution W4, the available chlorine concentration thereof was 265.5 ppm.

(4) After the obtained electrolyzed solution W4 was cooled to room temperature, potassium iodide was added thereto, and the electrolyzed solution W4 was stained by reacting the potassium iodide with hypochlorous acid in the electrolyzed solution W4. The electrolyzed solution W4 after staining is referred to as the stained electrolyzed solution W4'.

(5) 300 μl of the stained electrolyzed solution W4' was injected through the other end thereof into each PFA tube sealed at the one end.

(6) In the PFA tube filled with water, the other end through which the electrolyzed solution W4' was injected was sealed using parafilm. On the other hand, in the PFA tube filled with 3% hydrochloric acid solution, the other end thereof was melted and sealed using a burner. In addition, in the tube filled with water, since the electrolyzed solution W4' rises if the sealing is performed through heating and melting by a burner, the other end was sealed using parafilm.

Figure 8A:
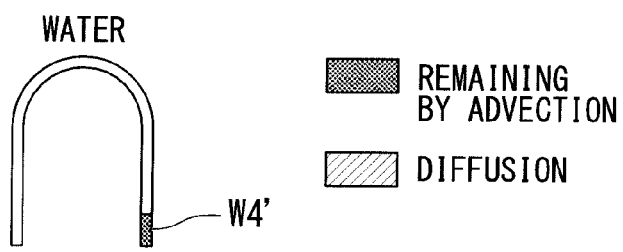
FIG. 8A is a view showing a state immediately after an electrolyzed solution is injected, in a second experiment of electrolyzed solution behavior.
Figure 8B:
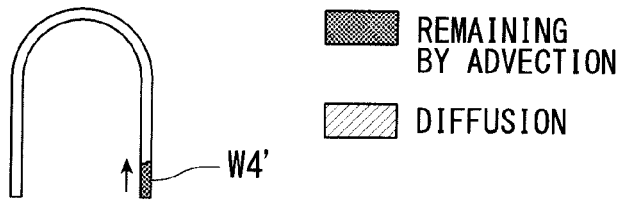
FIG. 8B is a view showing a state after a lapse of 20 hours in the second experiment of electrolyzed solution behavior.
Figure 8C:
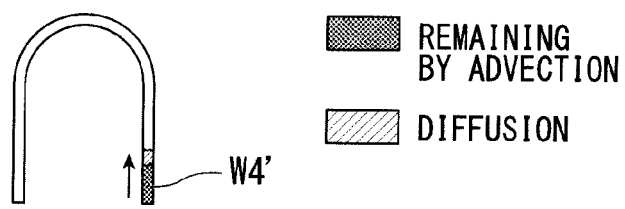
FIG. 8C is a view showing a state after a lapse of 50 hours in the second experiment of electrolyzed solution behavior.
Figure 8D:
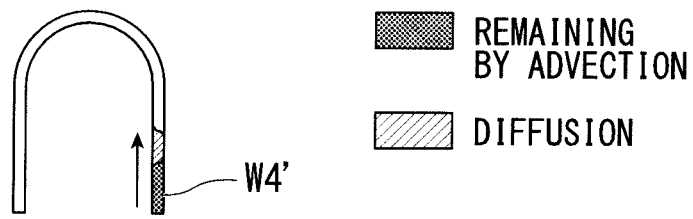
FIG. 8D is a view showing a state after a lapse of 70 hours in the second experiment of electrolyzed solution behavior.
Figure 8E:
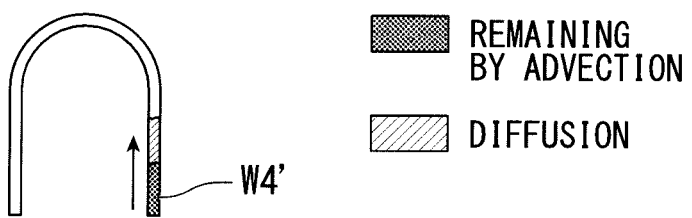
FIG. 8E is a view showing a state after a lapse of 100 hours in the second experiment of electrolyzed solution behavior.
Figure 8F:
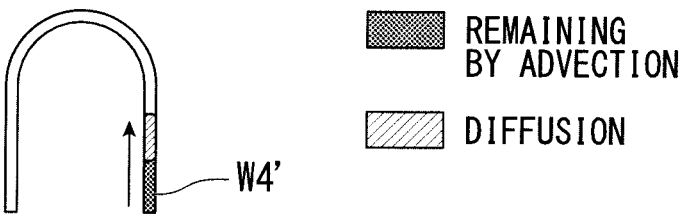
FIG. 8F is a view showing a state after a lapse of 200 hours in the second experiment of electrolyzed solution behavior.
Figure 9A:
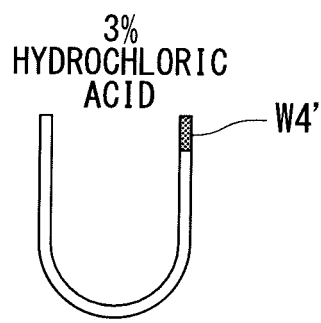
FIG. 9A is a view showing a state immediately after an electrolyzed solution is injected, in a second experiment of electrolyzed solution behavior.

(7) The tube filled with water was allowed to stand still in a state of an inverted U-shape as shown in FIGS. 8A to 8F, and the tube filled with 3% hydrochloric acid solution was allowed to stand still in a state of a U-shape as shown in FIGS. 9A to 9F. This is based on the results of the first experiment of electrolyzed solution behavior. FIGS. 8A and 9A show a state immediately after the stained electrolyzed solution W4' was injected.

Figure 9B:
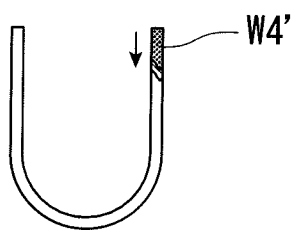
FIG. 9B is a view showing a state after a lapse of 20 hours in the second experiment of electrolyzed solution behavior.
Figure 9C:
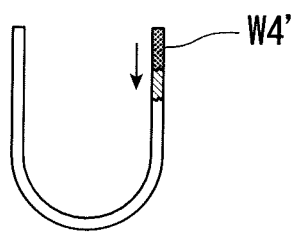
FIG. 9C is a view showing a state after a lapse of 50 hours in the second experiment of electrolyzed solution behavior.
Figure 9D:
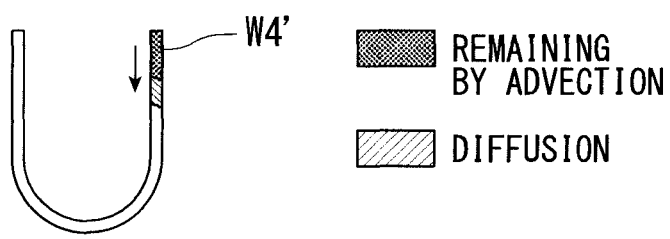
FIG. 9D is a view showing a state after a lapse of 70 hours in the second experiment of electrolyzed solution behavior.
Figure 9E:
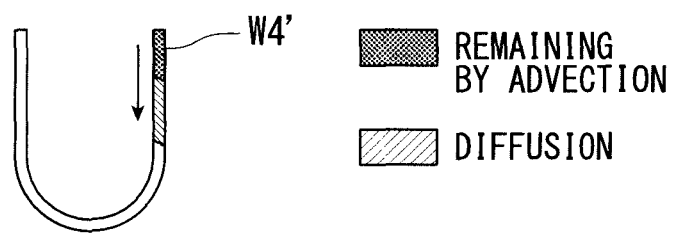
FIG. 9E is a view showing a state after a lapse of 100 hours in the second experiment of electrolyzed solution behavior.
Figure 9F:
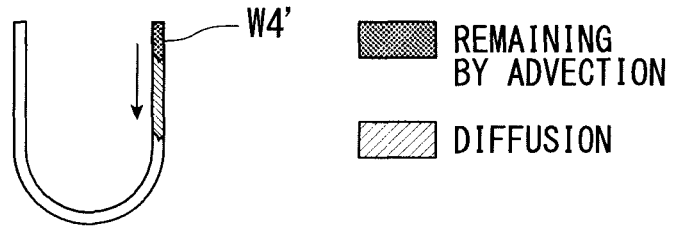
FIG. 9F is a view showing a state after a lapse of 200 hours in the second experiment of electrolyzed solution behavior.

(8) Temporal change of a colored state was observed and recorded after a lapse of 20 hours, 50 hours, 70 hours, 100 hours, or 200 hours from the time the stained electrolyzed solution W4' was injected. FIGS. 8B and 9B show a state after a lapse of 20 hours, FIGS. 8C and 9C show a state after a lapse of 50 hours, FIGS. 8D and 9D show a state after a lapse of 70 hours, FIGS. 8E and 9E show a state after a lapse of 100 hours, and FIGS. 8F and 9F show a state after a lapse of 200 hours.

In the second experiment of electrolyzed solution behavior, in a case where water was filled thereinto, as shown in FIGS. 8A to 8F, the stained electrolyzed solution W4' added to the other end (lower end) remained at the lower part, and the advection did not occur but the diffusion only occurred. A state was observed in which the electrolyzed solution W4' gradually diffused upward over time, but did not reach the top of the tube of inversed U-shape even after a lapse of 200 hours.

On the other hand, in a case where 3% hydrochloric acid solution was filled thereinto, as shown in FIGS. 9A to 9F, the stained electrolyzed solution W4' added to the other end (upper end) remained at the upper part, and the advection did not occur but the diffusion only occurred. A state was observed in which the electrolyzed solution W4' gradually diffused downward over time, but did not reach the bottom of the tube of U-shape even after a lapse of 200 hours.

That is, the results of the second experiment of electrolyzed solution behavior were similar to the behavior of the electrolyzed solution in the first experiment of electrolyzed solution behavior.

According to the results of the first and second experiments of electrolyzed solution behavior, it is estimated that if the raw material solution feed pump 3 is disposed above the electrolytic cell 2, the electrolyzed solution W4 is advected from the electrolytic cell 2 into the electrolyte solution W3 (hydrochloric acid solution) in the tube 32 immediately after the operation stops. If the electrolyzed solution W4 is advected into the tube 32, the corrosion of component parts such as the tube 32 may occur.

In addition, according to the results of the first and second experiments of electrolyzed solution behavior, it is estimated that if the dilution water pump 4 is disposed below the electrolytic cell 2, the electrolyzed solution W4 is advected from the electrolytic cell 2 into water in the tube 34 immediately after the operation stops. If the electrolyzed solution W4 is advected into the tube 34, the corrosion of component parts such as the tube 34 may occur.

From the results of the first and second experiments of electrolyzed solution behavior, it was clarified that effect in which the cause thereof was unknown in the related art was caused by the advection of the electrolyzed solution W4, wherein the effect includes the occurrence of deterioration such as discoloration or swelling of the tube 32 or 34 connecting the outlet 3*b* of the raw material solution feed pump 3 or the outlet 4*b* of the dilution water pump 4 to the inlet 26 of the electrolytic cell 2, and the occurrence of obstruction of the tube 32 or 34 by scrapings peeled off an inner wall of the tube 32 or 34. Furthermore, it was clarified that the advection of the electrolyzed solution W4 occurs in a case where the raw material solution feed pump 3 is disposed above the electrolytic cell 2, or in a case where the dilution water pump 4 is disposed below the electrolytic cell 2.

Figure 10A:
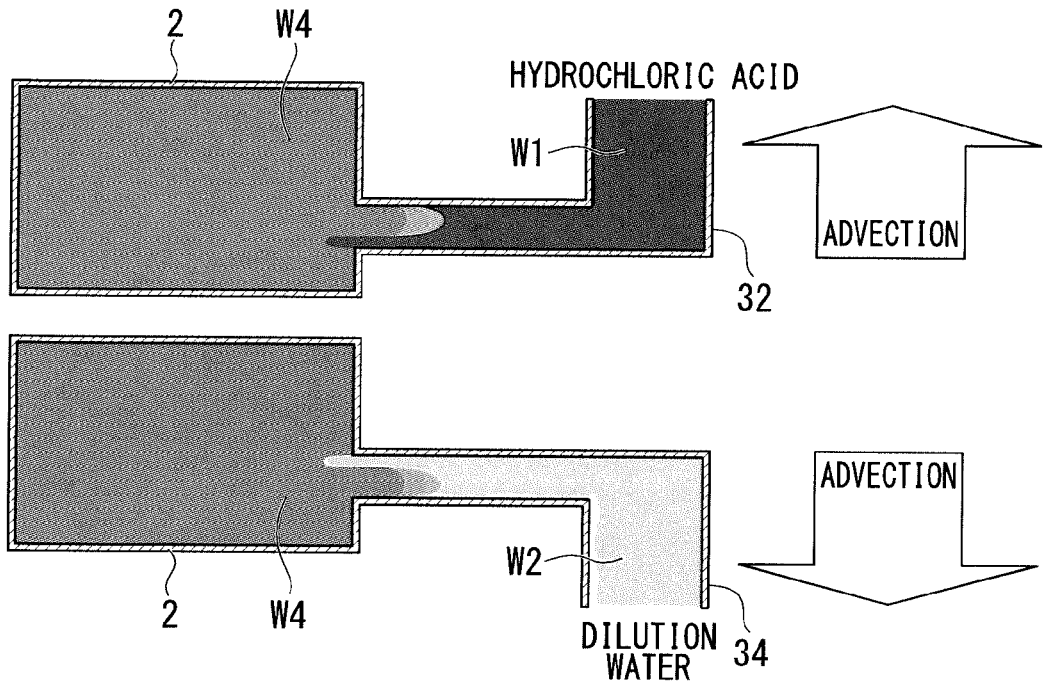
FIG. 10A is a principle diagram explaining a state of mutual advection of an electrolyzed solution, a raw material solution, and dilution water when the operation of an electrolytic cell is stopped.
Figure 10B:
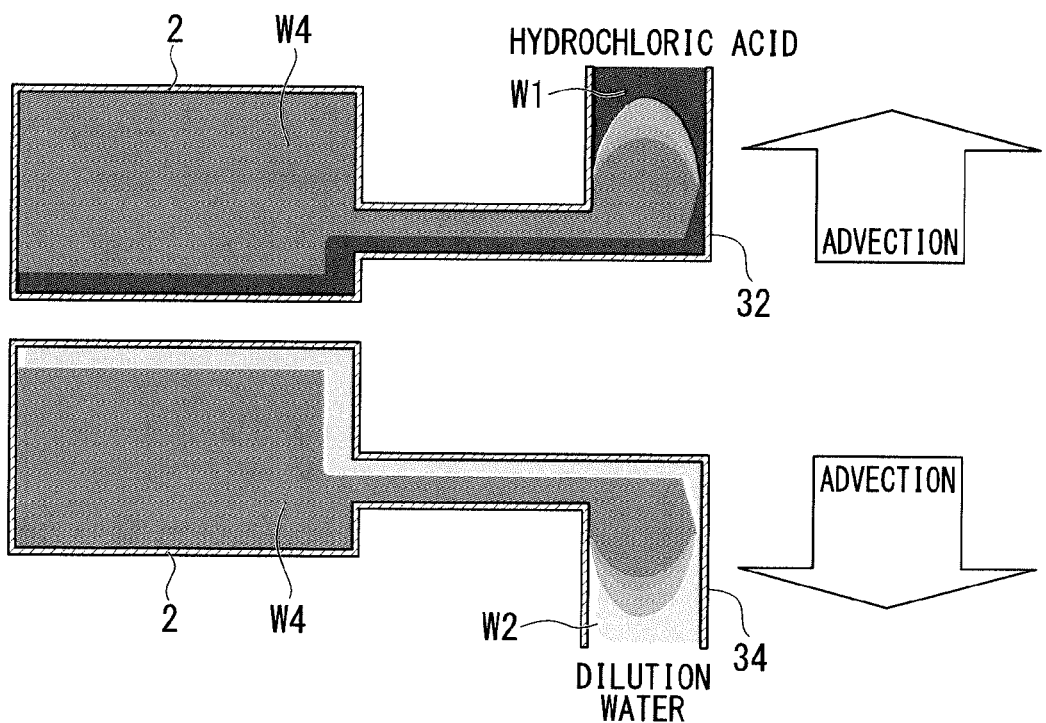
FIG. 10B is a principle diagram explaining a state of mutual advection of an electrolyzed solution, a raw material solution, and dilution water when the operation of an electrolytic cell is stopped.

On the other hand, it was found that the advection of the electrolyzed solution W4 may cause another unfavorable situation. FIG. 10A shows a state immediately after the operation of the electrolytic cell 2 is stopped, and FIG. 10B shows a state where the advection of the electrolyzed solution W4 from the electrolytic cell 2 to the tubes 32 and 34 has advanced. As shown in FIG. 10A, when the operation of the electrolytic cell 2 is stopped, as described above, the electrolyzed solution W4 remaining in the electrolytic cell 2 starts being advected toward the raw material solution pipe 32 or the dilution water pipe 34. However, during stoppage of the electrolysis water-making apparatus, the raw material solution pipe 32 and the dilution water pipe 34 are checked by a non-return mechanism (not shown), and thus the pipes 32 and 34 are in an obstructed state. Therefore, if the electrolyzed solution W4 is advected from the electrolytic cell 2 into the pipes 32 and 34, as shown in FIG. 10B, in an opposite manner, the raw material solution W3 (W1) is advected from the raw material solution pipe 32 into the electrolytic cell 2, and the dilution water W2 is advected from the dilution water pipe 34 into the electrolytic cell 2.

The raw material solution W3 advected into the electrolytic cell 2 remains at the lower part inside the electrolytic cell 2, and the dilution water W2 remains at the upper part inside the electrolytic cell 2. Since the raw material solution W3 has a high chlorine ion concentration, inside the electrolytic cell 2, the lower part has a high chlorine ion concentration, and the upper part has a low chlorine ion concentration. That is, the skewed distribution of chlorine ion concentration occurs inside the electrolytic cell 2 in the up-and-down direction. Overcurrent may occur due to the skewed distribution of chlorine ion concentration when the operation of the electrolytic cell 2 is restarted, and thus an error stop state of the electrolysis water-making apparatus may be caused.

As described above, the inventor ascertained, from the results of the first and second experiments of electrolyzed solution behavior, that the advection of the electrolyzed solution W4 causes the deterioration of components of the raw material solution feed pump 3 or the dilution water pump 4, the deterioration of the connection tubes 32 and 34, the obstruction of the tubes 32 and 34, or the like, and that the advection of the raw material solution W3 or the dilution water W2 associated with the advection of the electrolyzed solution W4 causes the error stop state at the time the operation of the electrolysis water-making apparatus in a halt state is restarted.

In addition, the diffusion occurs without reference to the occurrence of the advection. That is, although there are different situations, i.e., the diffusion occurs at the same time as the advection or the diffusion only occurs, the diffusion occurs without reference to occurrence or non-occurrence of the advection. However, the mass transfer rate in diffusion is low, and the electrolyzed solution W4 is diluted with the undiluted solution W1, the dilution water W2, or the electrolyte solution W3. Therefore, the extent of impact which the diffusion has on the electrolysis water-making apparatus is less compared to the advection.

As described above, the inventor clarified the cause of the phenomenon in which the electrolyzed solution W4 intrudes from the electrolytic cell 2 into the tube 32 after the operation stoppage of the electrolysis water-making apparatus A in spite of preventing the flowback of the electrolyzed solution W4 in the electrolytic cell 2 by the non-return mechanism. Based on this, in the electrolysis water-making apparatus A of this embodiment, the raw material solution feed pump 3 is provided so that the outlet 3*b* of the raw material solution feed pump 3 is disposed on the lower side of the inlet 26 of the electrolytic cell 2. Therefore, it is possible to prevent the electrolyzed solution W4 from intruding from the electrolytic cell 2 into the tube 32 connected to the raw material solution feed pump 3 immediately after the operation stops.

As a result, the corrosion of component parts due to the electrolyzed solution W4 can be prevented, and it is possible to extend the lives of the component parts. In addition, it is possible to decrease the frequency of replacement of the component parts, and to provide the electrolysis water-making apparatus A having excellent durability, economic efficiency, and reliability.

In addition, based on the cause of the above phenomenon clarified by the inventor, the dilution water pump 4 is provided so that the outlet 4*b* of the dilution water pump 4 is disposed on the upper side of the inlet 26 of the electrolytic cell 2. Therefore, it is possible to prevent the electrolyzed solution W4 from immediately intruding from the electrolytic cell 2 into the tube 34 connected to the dilution water pump 4 after the operation stops.

As a result, the corrosion of component parts due to the electrolyzed solution W4 can be prevented, and it is possible to further extend the lives of the component parts. In addition, it is possible to decrease the frequency of replacement of the component parts, and to provide the electrolysis water-making apparatus A having further excellent durability, economic efficiency, and reliability.

Furthermore, the raw material solution feed pump 3 or the dilution water pump 4 is only fixed to the pump-positioning-holding hole 43 or 44 of the bracket 42 so as to be attachable and detachable, and thus the raw material solution feed pump 3 or the dilution water pump 4 can be easily arranged so that the outlet 3*b* or 4*b* is disposed in a predetermined position with respect to the inlet 26 of the electrolytic cell 2. In addition, since the raw material solution feed pump 3 or the dilution water pump 4 is fixed to the bracket 42 so as to be attachable and detachable, it is also possible to improve the maintainability thereof.

In the electrolysis water-making apparatus A of this embodiment, since it is possible to prevent the advection of the electrolyzed solution W4 from the electrolytic cell 2 toward the tube 32 or 34, it is possible to prevent the advection of the raw material solution W3 or the dilution water W2 from the tube 32 or 34 into the electrolytic cell 2 at the same time.

Therefore, the raw material solution W3 or the dilution water W2 does not intrude into the electrolytic cell 2 during stoppage of the electrolysis water-making apparatus A, and thus it is possible to prevent the phenomenon in which the skewed distribution of a chlorine ion occurs inside the electrolytic cell 2 in the up-and-down direction. Accordingly, the error stop state of the apparatus due to the occurrence of an overcurrent at the time the operation of the electrolysis water-making apparatus A in a halt state is restarted can be prevented. As a result, it is possible to provide the electrolysis water-making apparatus A capable of more stably operating than that in the related art.

Figure 11A:
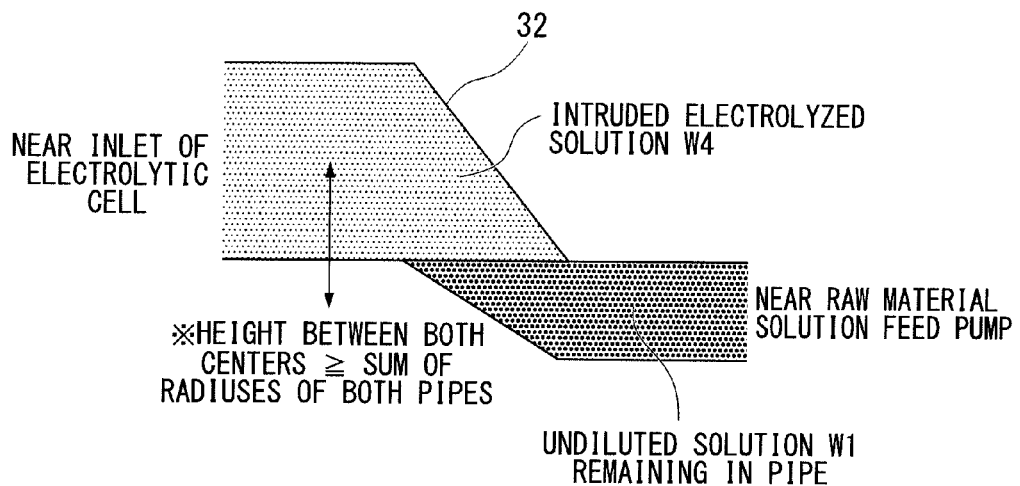
FIG. 11A is a diagram showing a concept of intrusion prevention of an electrolyzed solution in the electrolysis water-making apparatus related to the embodiment of the present invention.
Figure 11B:
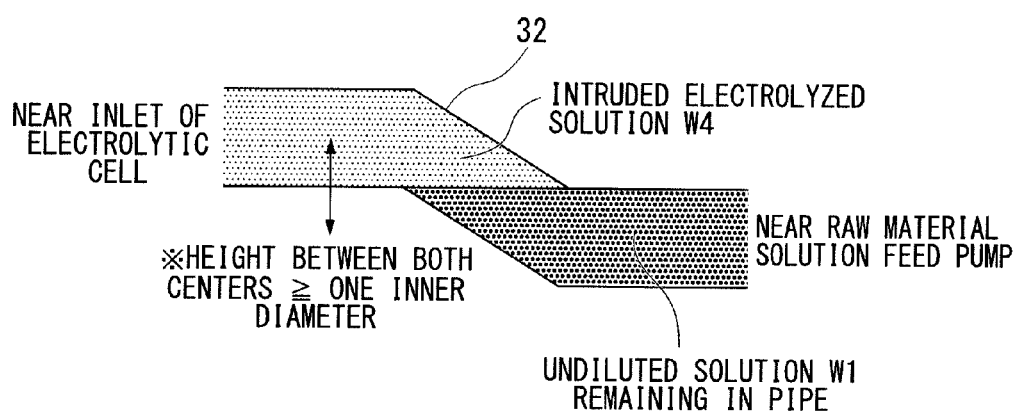
FIG. 11B is a diagram showing a concept of intrusion prevention of an electrolyzed solution in the electrolysis water-making apparatus related to the embodiment of the present invention.

It is only necessary to set the level of the raw material solution feed pump 3 with respect to the electrolytic cell 2 so that the lowest surface of the electrolyzed solution W4 intruded into a portion of the tube 32 near the inlet 26 of the electrolytic cell 2 is disposed above a surface of the raw material solution remaining in a portion of the tube 32 near the outlet 3b of the raw material solution feed pump 3. That is, as shown in FIG. 11A, it is only necessary to arrange the raw material solution feed pump 3 in the lower side of the electrolytic cell 2 so that the height between both centers of the outlet 3b of the raw material solution feed pump 3 and the inlet 26 of the electrolytic cell 2 becomes greater than or equal to the sum of both radiuses of the outlet 3b and the inlet 26. In addition, in a case where the outlet 3b of the raw material solution feed pump 3 and the inlet 26 of the electrolytic cell 2 have the same diameter, as shown in FIG. 11B, it is only necessary to set the height between both centers of the outlet 3b of the raw material solution feed pump 3 and the inlet 26 of the electrolytic cell 2 to be greater than or equal to an inner diameter of the outlet 3b or the inlet 26.

Figure 12A:
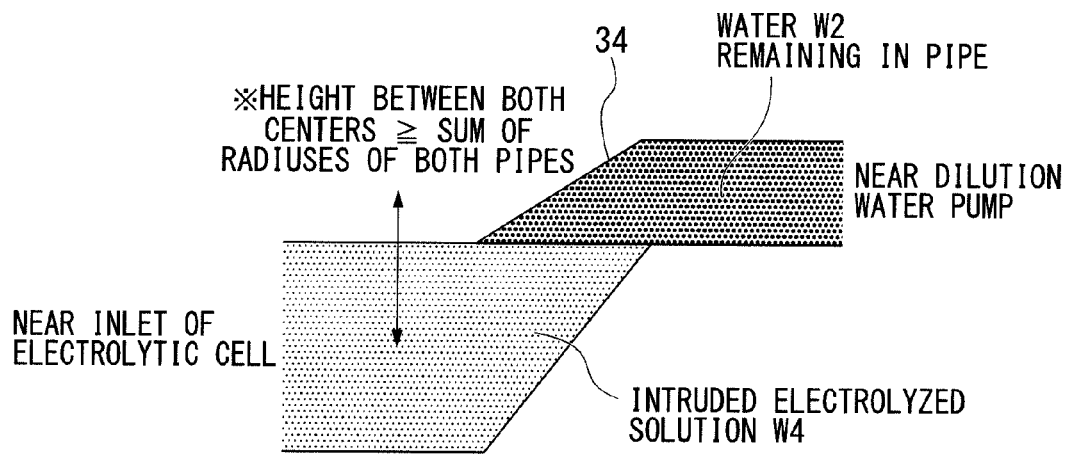
FIG. 12A is a diagram showing a concept of intrusion prevention of an electrolyzed solution in the electrolysis water-making apparatus related to the embodiment of the present invention.
Figure 12B:
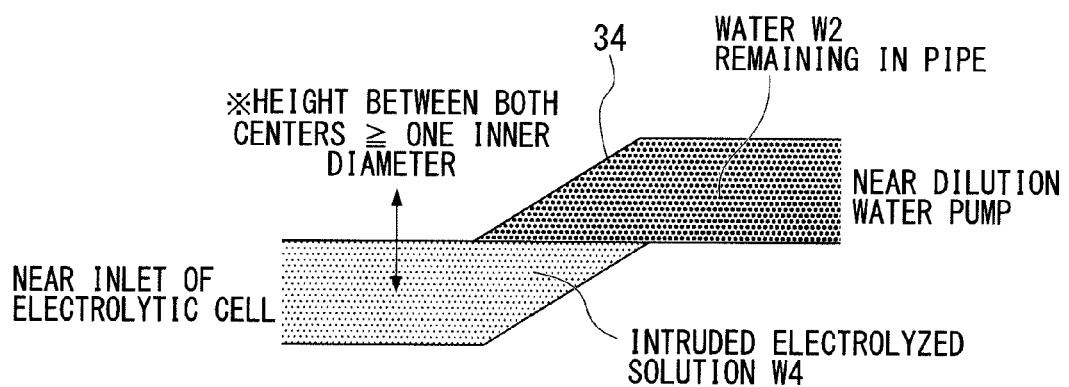
FIG. 12B is a diagram showing a concept of intrusion prevention of an electrolyzed solution in the electrolysis water-making apparatus related to the embodiment of the present invention.

In addition, it is only necessary to set the level of the dilution water pump 4 with respect to the electrolytic cell 2 so that the highest surface of the electrolyzed solution W4 intruded into a portion of the tube 34 near the inlet 26 of the electrolytic cell 2 is disposed below a surface of the water W2 remaining in a portion of the tube 34 near the outlet 4b of the dilution water pump 4. That is, as shown in FIG. 12A, it is only necessary to arrange the dilution water pump 4 in the upper side of the electrolytic cell 2 so that the height between both centers of the outlet 4b of the dilution water pump 4 and the inlet 26 of the electrolytic cell 2 becomes greater than or equal to the sum of both radiuses of the outlet 4b and the inlet 26. In addition, in a case where the outlet 4b of the dilution water pump 4 and the inlet 26 of the electrolytic cell 2 have the same diameter, as shown in FIG. 12B, it is only necessary to set the height between both centers of the outlet 4b of the dilution water pump 4 and the inlet 26 of the electrolytic cell 2 to be greater than or equal to an inner diameter of the outlet 4b or the inlet 26.

The above principle is described based on the electrolysis water-making apparatus A related to this embodiment of the present invention. For example, a configuration is described in which the tube 32 allowing the undiluted solution W1 to flow into the electrolytic cell 2 and the tube 34 allowing the dilution water W2 to flow thereinto are connected via the T-fitting 35. FIG. 13B shows the configuration of this embodiment of the present invention, and FIG. 13A shows a contrast example for comparison.

As shown in the contrast example of FIG. 13A, when the outlet 3b (not shown in FIGS. 13A and 13B) of the raw material solution feed pump 3 used to supply the undiluted solution W1 is positioned above the inlet 26 of the electrolytic cell 2, and when the outlet 4b (not shown in FIGS. 13A and 13B) of the dilution water pump 4 used to supply the dilution water W2 is positioned below the inlet 26 of the electrolytic cell 2, the electrolyzed solution W4 remaining in the electrolytic cell 2 is advected into the T-fitting 35 at the time the operation of the electrolytic cell 2 is stopped. Furthermore, the electrolyzed solution W4 is advected upward in the tube 32, and is advected downward in the tube 34. In an opposite manner, the undiluted solution W1 is advected from the tube 32 into the electrolytic cell 2, and the dilution water W2 is advected from the tube 34 into the electrolytic cell 2.

In contrast, as shown in FIG. 13B of this embodiment of the present invention, when the outlet 3b of the raw material solution feed pump 3 used to supply the undiluted solution W1 is positioned below the inlet 26 of the electrolytic cell 2, and when the outlet 4b of the dilution water pump 4 used to supply the dilution water W2 is positioned above the inlet 26 of the electrolytic cell 2, even if the electrolyzed solution W4 remaining in the electrolytic cell 2 is advected into the T-fitting 35, the electrolyzed solution W4 is not advected downward in the tube 32, or upward in the tube 34. Accordingly, the undiluted solution W1 is not advected from the tube 32 into the electrolytic cell 2, and neither is the dilution water W2 advected from the tube 34 into the electrolytic cell 2.

Figure 13A:
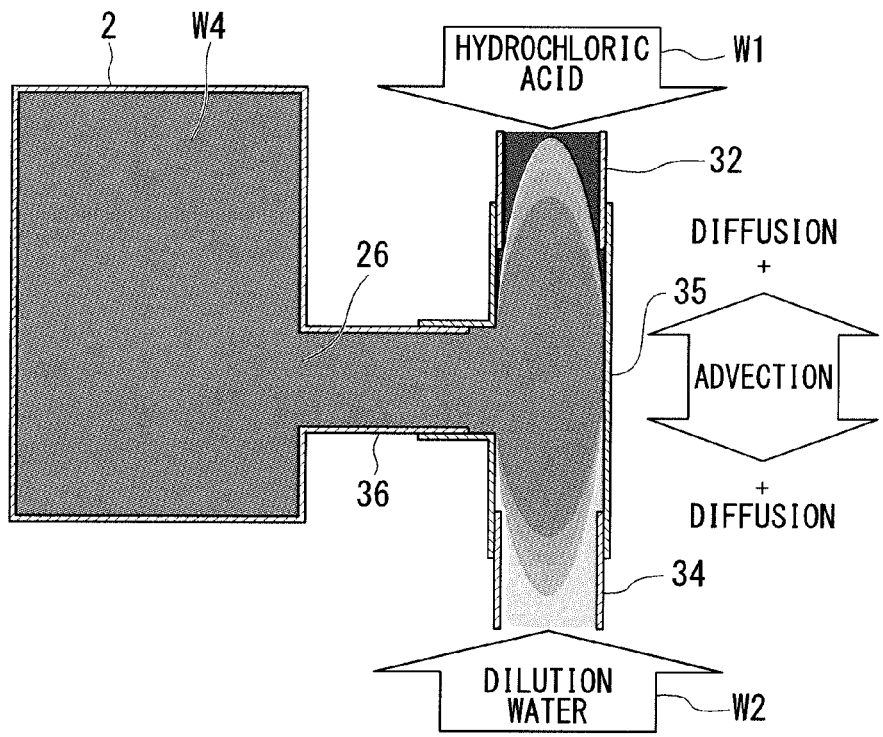
FIG. 13A is a principle diagram explaining an effect in the electrolysis water-making apparatus related to the embodiment of the present invention.
Figure 13B:
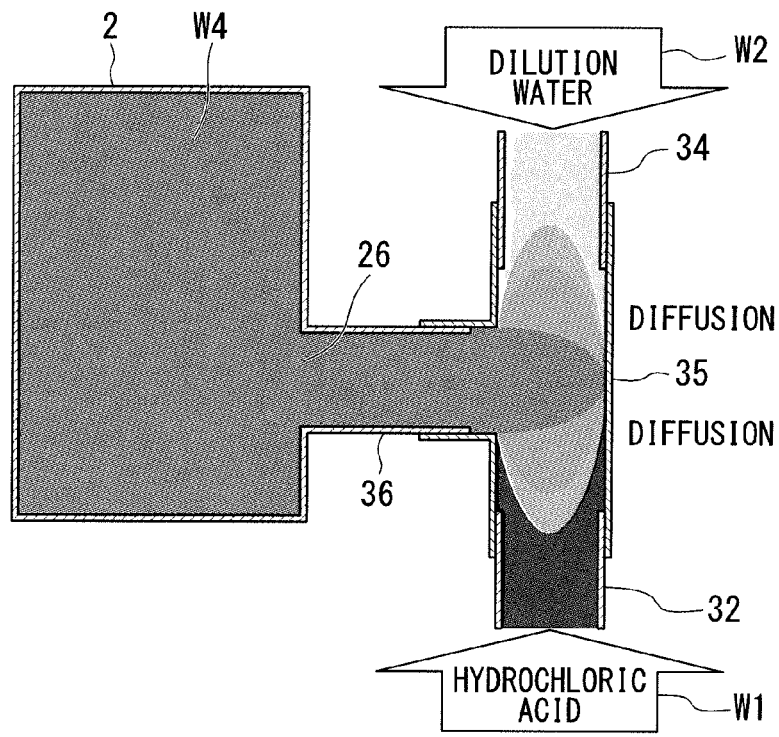
FIG. 13B is a principle diagram explaining an effect in the electrolysis water-making apparatus related to the embodiment of the present invention.

In addition, although the phenomenon of diffusion occurs in both cases of FIGS. 13A and 13B, the impact which the diffusion has on the electrolysis water-making apparatus A is slight compared to the advection.

Hereinbefore, an embodiment of an electrolysis water-making apparatus related to the present invention has been described. However, the present invention is not limited to the above-described embodiment, and modifications to the configuration can be adopted within the scope of the present invention.

For example, in this embodiment, the raw material solution feed pump 3 and the dilution water pump 4 used to supply the undiluted solution W1 and the dilution water W2 respectively are tube pumps, but another type of a pump may be employed as the raw material solution feed pump 3 or the dilution water pump 4. The electrolysis water-making apparatus A may be configured so that a check valve is provided in the tube 32 or 34 (pipe, second pipe) which connects the outlet 3b or 4b of the pump 3 or 4 to the inlet 26 of the electrolytic cell 2. Even in this case, by arranging the raw material solution feed pump 3 or the dilution water pump 4 into a positional relationship similar to this embodiment with respect to the electrolytic cell 2, the same operations and effects as that of this embodiment can be obtained.

In addition, in this embodiment, the electrolysis water-making apparatus A is configured so that the dilution water W2 supplied by the dilution water pump 4 is mixed in the undiluted solution W1 supplied by the raw material solution feed pump 3, thereby producing the electrolyte solution W3 having a predetermined concentration, and the produced electrolyte solution W3 is let to flow into the electrolytic cell 2.

On the other hand, the electrolysis water-making apparatus A may be configured so that each of the raw material solution feed pump 3 and the dilution water pump 4 is individually connected to the electrolytic cell 2, the undiluted solution W1 supplied from the raw material solution feed pump 3 and the dilution water W2 supplied from the dilution water pump 4 are mixed together inside the electrolytic cell 2, and the electrolyte solution W3 having a predetermined concentration is let to flow in the electrolytic cell 2. In addition, the electrolytic cell 2 may be individually provided with an inlet allowing the undiluted solution W1 to flow thereinto and with a second inlet allowing the dilution water W2 to flow thereinto. The outlet of the raw material solution feed pump 3 and the inlet of the electrolytic cell 2 are connected via a pipe, and the second outlet of the dilution water pump 4 and the second inlet of the electrolytic cell 2 are connected via a second pipe. Even in this case, if the outlet is disposed on the lower side of the inlet and the second outlet is disposed on the upper side of the second inlet, the same operations and effects as that of the above embodiment can be obtained.

Further, the electrolysis water-making apparatus A may be configured so that the electrolyte solution W3 which has been adjusted to have a predetermined concentration beforehand by mixing the undiluted solution W1 and the dilution water W2 together is supplied to the electrolytic cell 2 by the raw material solution feed pump 3. That is, the dilution water pump 4 may not be provided therein. Even in the electrolysis water-making apparatus A having this configuration, by arranging the pumps 3 and 4 and the electrolytic cell 2 into a positional relationship similar to this embodiment, the same operations and effects as that of this embodiment can be obtained.

In addition, even when the outlet 3b is disposed on the lower side of the inlet 26, in a case where an intermediate portion of the tube 32 is disposed on the upper side of the inlet 26 (that is, above the horizontal plane in which the inlet 26 is positioned), the advection of the undiluted solution W1 and the electrolyzed solution W4 may occur between the intermediate portion and the inlet 26. If this advection has to be also prevented, it is only necessary to dispose the entire tube 32 below the horizontal plane in which the inlet 26 is positioned.

Similarly, even when the outlet 4b is disposed on the upper side of the inlet 26, in a case where an intermediate portion of the tube 34 is disposed on the lower side of the inlet 26 (that is, below the horizontal plane in which the inlet 26 is positioned), the advection of the dilution water W2 and the electrolyzed solution W4 may occur between the intermediate portion and the inlet 26. If this advection has to be also prevented, it is only necessary to dispose the entire tube 34 above the horizontal plane in which the inlet 26 is positioned.

In addition, in this embodiment of the present invention, both of the raw material solution feed pump 3 and the dilution water pump 4 are fixed to the pump bracket 42. On the other hand, each of the raw material solution feed pump 3 and the dilution water pump 4 may be fixed to an individual bracket, and be provided in the electrolytic cell 2 through the bracket.

INDUSTRIAL APPLICABILITY

The present invention can be widely applied to an electrolysis water-making apparatus used to make electrolysis water by electrolyzing a raw material solution including a chlorine ion.

DESCRIPTION OF REFERENCE SIGNS

1 tank
2 electrolytic cell
3 raw material solution feed pump
3a inlet
3b outlet
4 dilution water pump
4a inlet
4b outlet (second outlet)
5 electrolysis power supply
6 mixer
10 casing
11, 12 electrode plate
13, 14, 15 spacer
16 electrode through-hole
17, 18 electrode
20 body
21, 22 side plate
26 inlet (inlet, second inlet)
27 outlet
28 electrolysis chamber
30 fluid channel
31 tube
32 tube (pipe)
33 tube
34 tube (second pipe)
35 T-fitting
36 tube (pipe, second pipe)
40 fixed nail
41 electrolytic cell bracket
42 pump bracket (bracket, second bracket)
43 pump-positioning-holding hole (pump-positioning-holding section)
44 pump-positioning-holding hole (second pump-positioning-holding section)
45 test tube
46 test tube
A electrolysis water-making apparatus
O1 axis
W1 undiluted water (raw material solution)
W2 water (dilution water)
W3 electrolyte solution (raw material solution)
W4 electrolyzed solution
W5 electrolysis-sterilized water (electrolysis water)

The invention claimed is:

1. An electrolysis water-making apparatus for making electrolysis water by electrolyzing a raw material solution including a chlorine ion, the electrolysis water-making apparatus comprising:
   an electrolytic cell;
   a raw material solution feed pump used to supply the raw material solution to the electrolytic cell;
   a pipe connecting an outlet of the raw material solution feed pump allowing the raw material solution to be discharged therefrom and an inlet allowing the raw material solution to flow into the electrolytic cell,
   a dilution water pump used to supply dilution water to be mixed in the raw material solution so that the raw material solution has a predetermined electrolyte concentration; and
   a second pipe connecting a second outlet of the dilution water pump allowing the dilution water to be discharged therefrom and a second inlet allowing the dilution water to flow into the electrolytic cell,
   wherein the raw material solution feed pump is provided so that the outlet is disposed on a lower side of the inlet and wherein the dilution water pump is provided so that the second outlet is disposed on an upper side of the second inlet.

2. The electrolysis water-making apparatus according to claim 1, further comprising
   a bracket fixed to the electrolytic cell so as to be attachable and detachable,
   wherein the bracket is provided with a pump-positioning-holding section to which the raw material solution feed pump is fixed so as to be attachable and detachable and which positions and holds the raw material solution feed pump so that the outlet is disposed in a predetermined position with respect to the inlet.

3. The electrolysis water-making apparatus according to claim 1, further comprising:
   a second bracket fixed to the electrolytic cell so as to be attachable and detachable, wherein the second bracket is provided with a second pump-positioning-holding section to which the dilution water pump is fixed so as to be attachable and detachable and which positions and holds the dilution water pump so that the second outlet is disposed in a predetermined position with respect to the second inlet.

4. The electrolysis water-making apparatus according to claim 1, wherein the distance between a center of the outlet and a center of the inlet is equal to or greater than the sum of a radius of the outlet and a radius of the inlet.

* * * * *